(12) United States Patent
Chatzidakis

(10) Patent No.: US 10,842,243 B2
(45) Date of Patent: Nov. 24, 2020

(54) WEIGHT SUPPORT SYSTEMS

(71) Applicant: Pantelis Chatzidakis, Whitestone, NY (US)

(72) Inventor: Pantelis Chatzidakis, Whitestone, NY (US)

(*) Notice: Subject to any disclaimer, the term of this patent is extended or adjusted under 35 U.S.C. 154(b) by 245 days.

(21) Appl. No.: 15/843,060

(22) Filed: Dec. 15, 2017

(65) Prior Publication Data
US 2019/0183258 A1    Jun. 20, 2019

(51) Int. Cl.
*A45F 3/04* (2006.01)
*A47D 1/10* (2006.01)
(Continued)

(52) U.S. Cl.
CPC .................. *A45F 3/04* (2013.01); *A45F 3/10* (2013.01); *A47D 1/002* (2013.01); *A47D 13/025* (2013.01);
(Continued)

(58) Field of Classification Search
CPC ..... A45F 3/00; A45F 3/04; A45F 3/10; A47D 5/006; A47D 5/00; A47D 1/002; A47D 1/06; A47D 13/025; B62B 9/12
See application file for complete search history.

(56) References Cited

U.S. PATENT DOCUMENTS 2,925,205 A * 2/1960 Hunt .................... A45F 3/10
224/262
3,889,859 A * 6/1975 Joseph ................... A45F 3/08
224/634
(Continued)

FOREIGN PATENT DOCUMENTS

AU    1882576 A    4/1978
CA    2203572 A1    10/1998
(Continued)

OTHER PUBLICATIONS

PCT Invitation to Pay Additional Fees and Communication Relating to the Results of the Partial International Search, corresponding to PCT/US2018/064835 dated Apr. 12, 2019, 12 pgs.
(Continued)

*Primary Examiner* — John D Walters
(74) *Attorney, Agent, or Firm* — Carter, DeLuca & Farrell LLP; George Likourezos

(57) ABSTRACT

A diaper-changing platform system is disclosed having a structural frame supporting member that receives a platform member. The platform member is configured with interlocking sections configured such that at least one interlocking section can be positioned to project from the platform member to enable an infant or toddler to sit on the interlocking section and is also configured to be positioned such that the platform member defines a generally flat surface enabling an infant or toddler to be positioned lying on the generally flat surface. A stroller for transporting an infant or toddler includes a frame and the diaper-changing platform system. The frame of the stroller receives the diaper-changing platform system when the platform member enables an infant or toddler to sit on at least one interlocking section to enable transporting via the stroller the diaper-changing platform system. A weight supporting system including usage of supporting ribs and exoskeletons is included.

12 Claims, 31 Drawing Sheets

(51) Int. Cl.
*A47D 13/02* (2006.01)
*A45F 3/10* (2006.01)
*A47D 1/00* (2006.01)
*A45F 3/14* (2006.01)
*A47D 5/00* (2006.01)
*A47D 1/06* (2006.01)
*B62B 9/12* (2006.01)

(52) U.S. Cl.
CPC .......... *A45F 2003/146* (2013.01); *A47D 1/06* (2013.01); *A47D 5/00* (2013.01); *A47D 5/006* (2013.01); *B62B 9/12* (2013.01)

(56) References Cited

U.S. PATENT DOCUMENTS

| | | | |
|---|---|---|---|
| 4,015,759 A * | 4/1977 | Dreissigacker | A45F 3/10 224/262 |
| 4,154,381 A * | 5/1979 | Zufich | A45F 3/08 224/262 |
| 4,303,186 A * | 12/1981 | Ollinger, IV | A45F 3/08 224/634 |
| 4,911,346 A * | 3/1990 | Shallman | A45F 3/08 224/153 |
| 5,161,270 A | 11/1992 | Najmabadi | |
| 5,458,143 A * | 10/1995 | Herr | A61H 3/02 135/68 |
| 5,609,279 A * | 3/1997 | O'Shea | A47D 13/025 224/155 |
| 5,695,100 A * | 12/1997 | O'Brien | A47C 7/66 135/143 |
| 5,904,282 A * | 5/1999 | Gleason | A45F 3/08 224/263 |
| 5,934,529 A * | 8/1999 | O'Brien | A47C 7/66 135/96 |
| 6,199,732 B1 * | 3/2001 | Swetish | A45F 3/04 224/262 |
| 6,364,186 B1 * | 4/2002 | Gilmour | A45F 3/02 224/625 |
| 7,618,055 B2 | 11/2009 | Chuah et al. | |
| 8,056,571 B2 * | 11/2011 | DeLace | A61H 3/02 135/73 |
| 8,128,103 B1 | 3/2012 | Schutzendorf et al. | |
| 8,191,745 B2 | 6/2012 | Gray | |
| 9,200,871 B2 * | 12/2015 | Hexels | A45F 3/06 |
| 9,332,821 B2 * | 5/2016 | Janssen | A45F 3/04 |
| 10,028,570 B2 * | 7/2018 | Beck | A41F 17/00 |
| 10,064,781 B2 * | 9/2018 | Clausen | A61H 3/02 |
| 2004/0262354 A1 * | 12/2004 | Meyer | A45F 3/047 224/628 |
| 2004/0262355 A1 * | 12/2004 | Meyer | A45F 3/08 224/628 |
| 2004/0262358 A1 * | 12/2004 | Meyer | A45F 3/08 224/628 |
| 2006/0131841 A1 | 6/2006 | Huang | |
| 2009/0313756 A1 | 12/2009 | Rogers | |
| 2012/0292361 A1 * | 11/2012 | Thiruppathi | A45F 3/08 224/576 |
| 2013/0038036 A1 | 2/2013 | Lester | |
| 2014/0125020 A1 | 5/2014 | Sime et al. | |
| 2015/0157114 A1 * | 6/2015 | Janssen | A45F 3/04 224/265 |
| 2015/0320150 A1 * | 11/2015 | Beck | A45F 3/06 24/647 |
| 2016/0128491 A1 | 5/2016 | Martiniuk et al. | |
| 2016/0309884 A1 * | 10/2016 | Sellers | A45F 3/047 |
| 2017/0035187 A1 | 2/2017 | Chapman | |

FOREIGN PATENT DOCUMENTS

| | | |
|---|---|---|
| DE | 202015105659 U1 | 12/2015 |
| FR | 960444 A | 4/1950 |
| JP | S5326641 U | 3/1978 |
| WO | 2004075619 A2 | 9/2004 |

OTHER PUBLICATIONS

PCT International Search Report and Written Opinion corresponding to PCT/US2018/064835 dated Jun. 11, 2019.

* cited by examiner

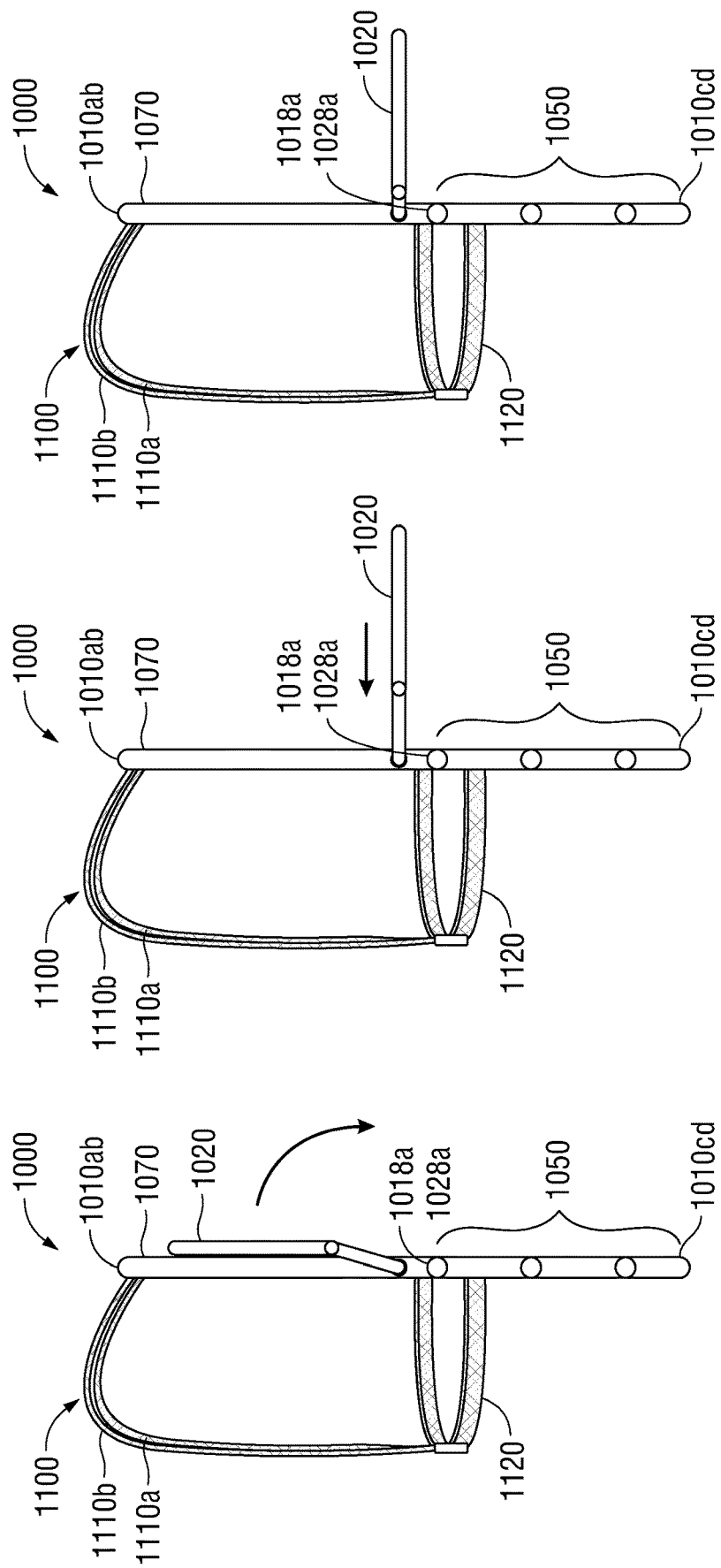

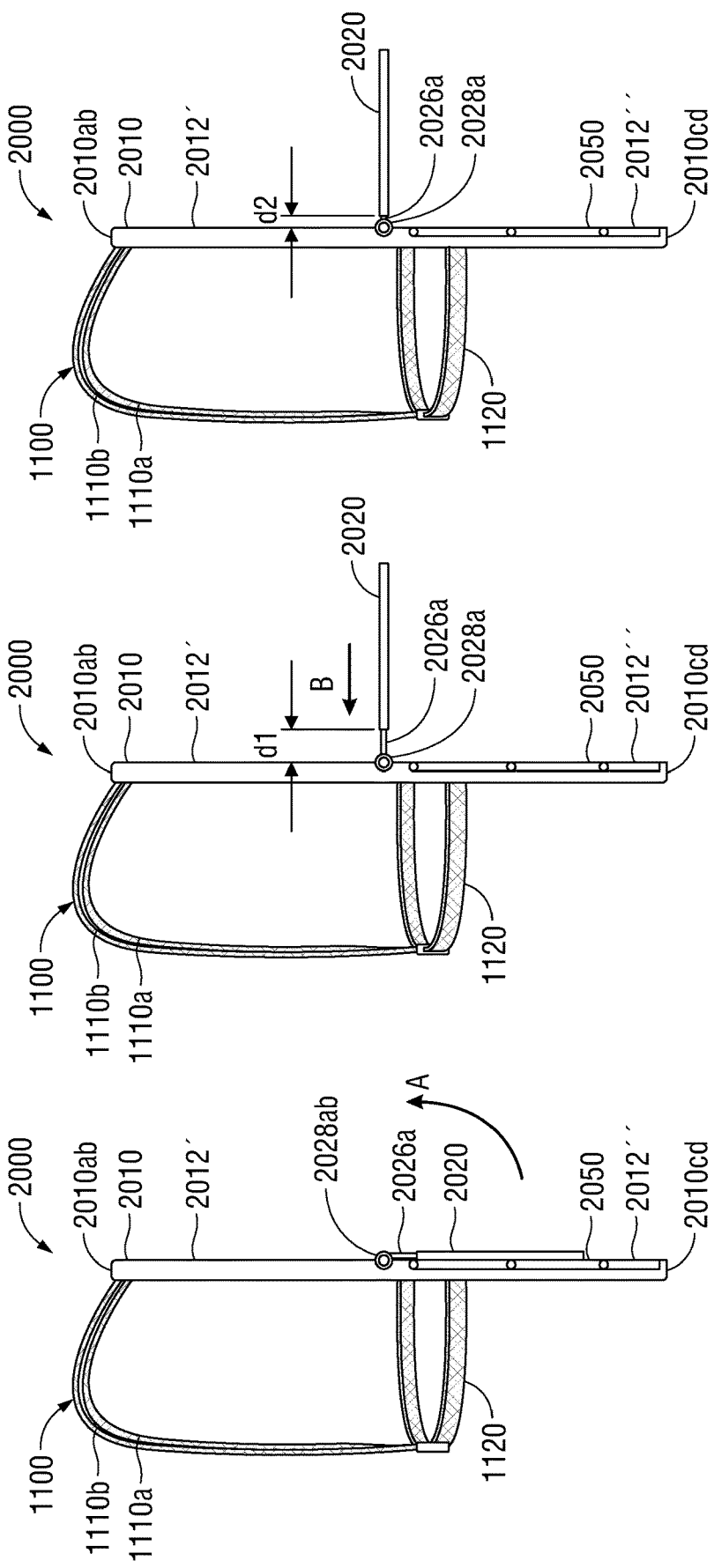

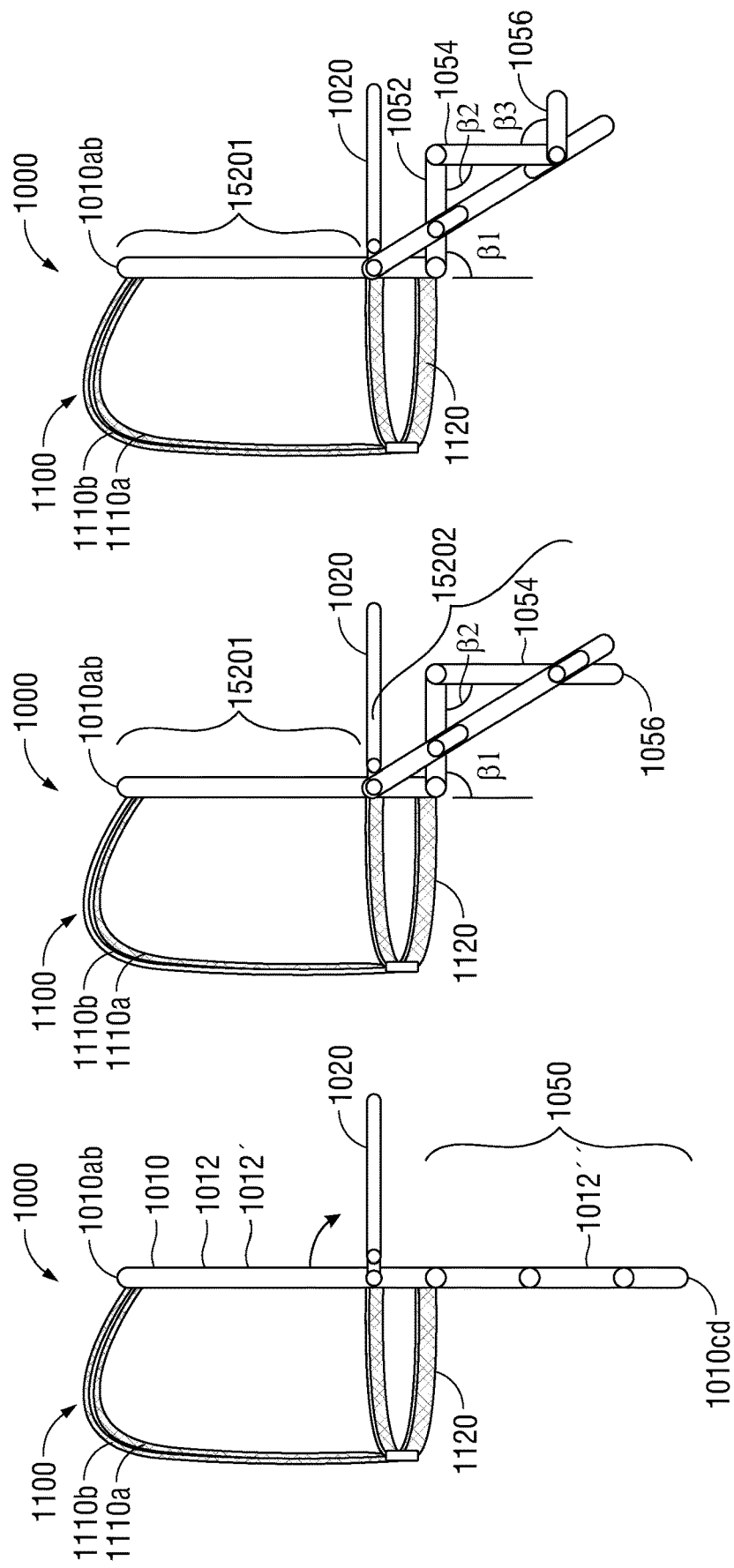

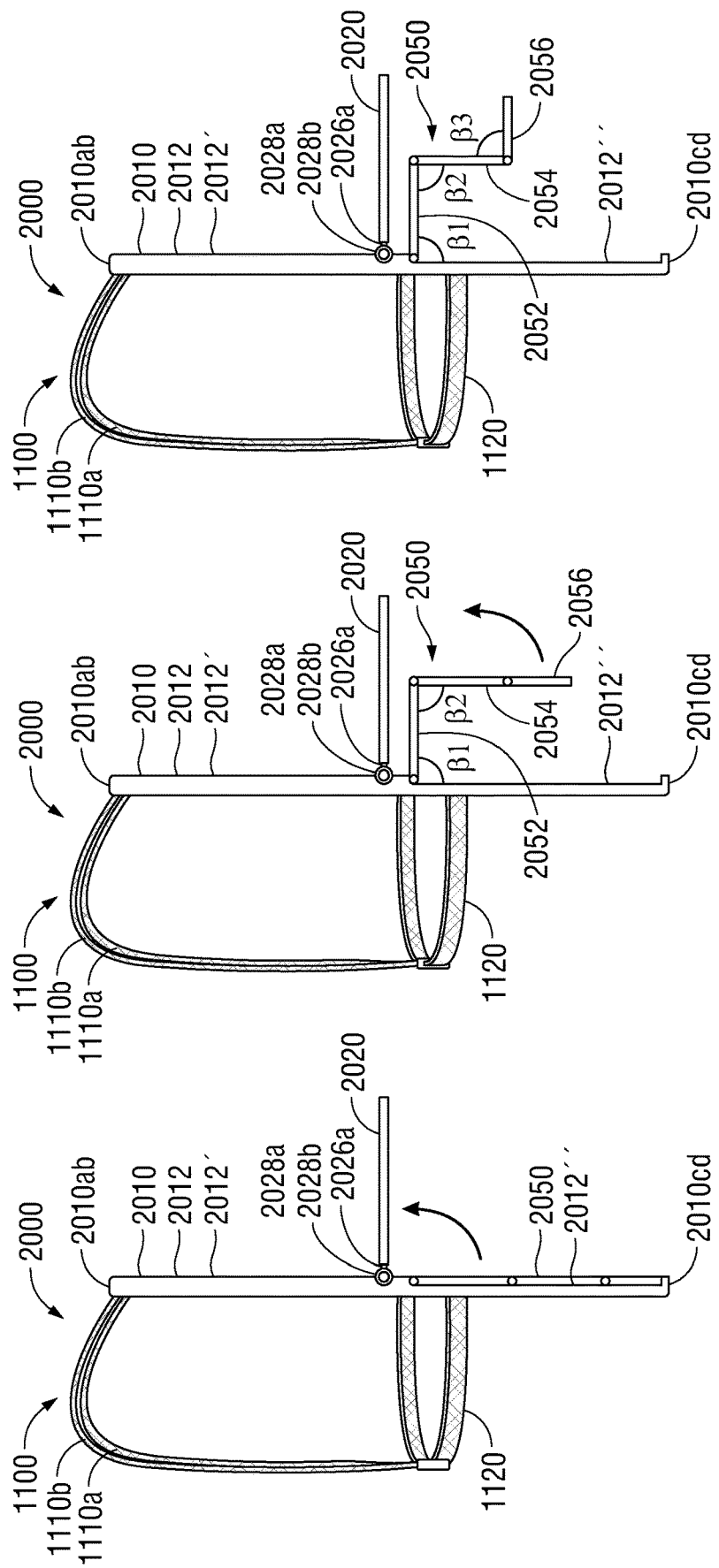

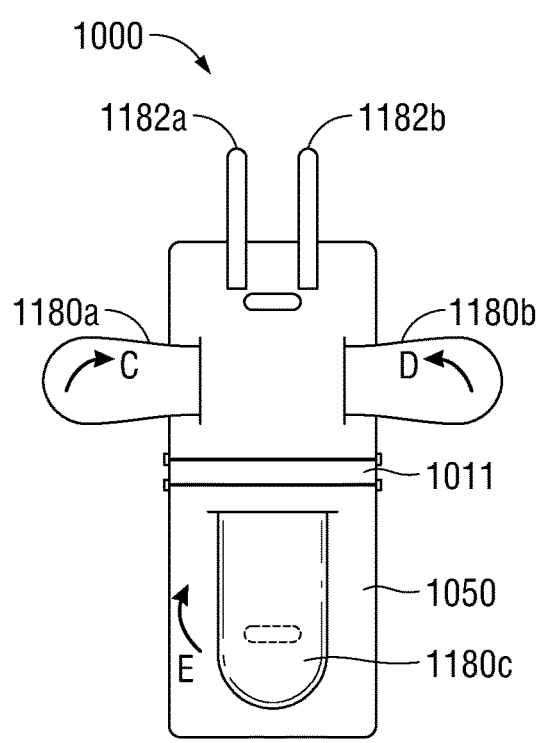
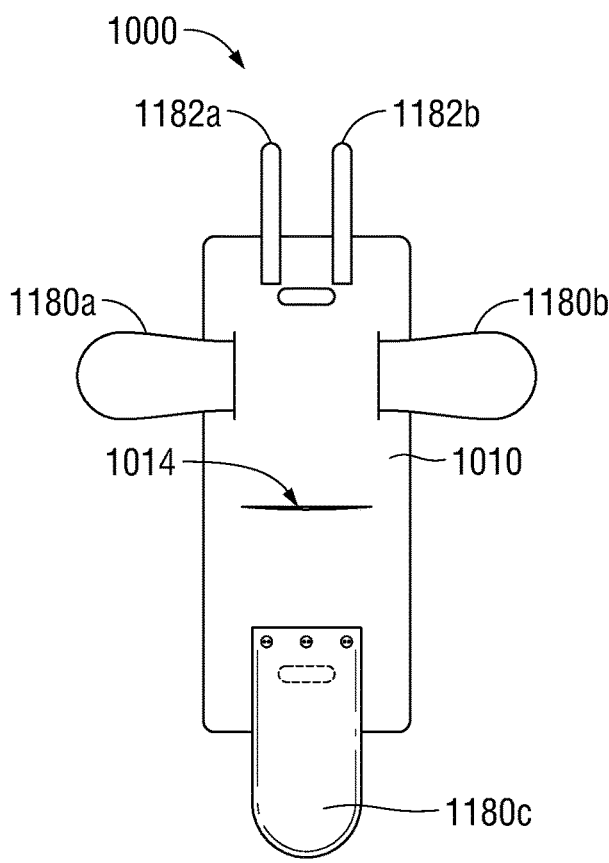
FIG. 23   FIG. 24
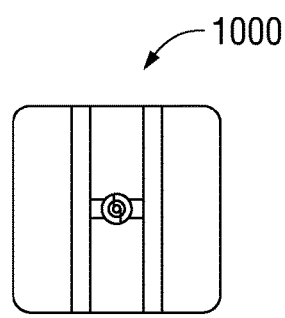
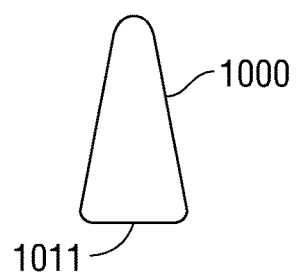
FIG. 25A   FIG. 25B

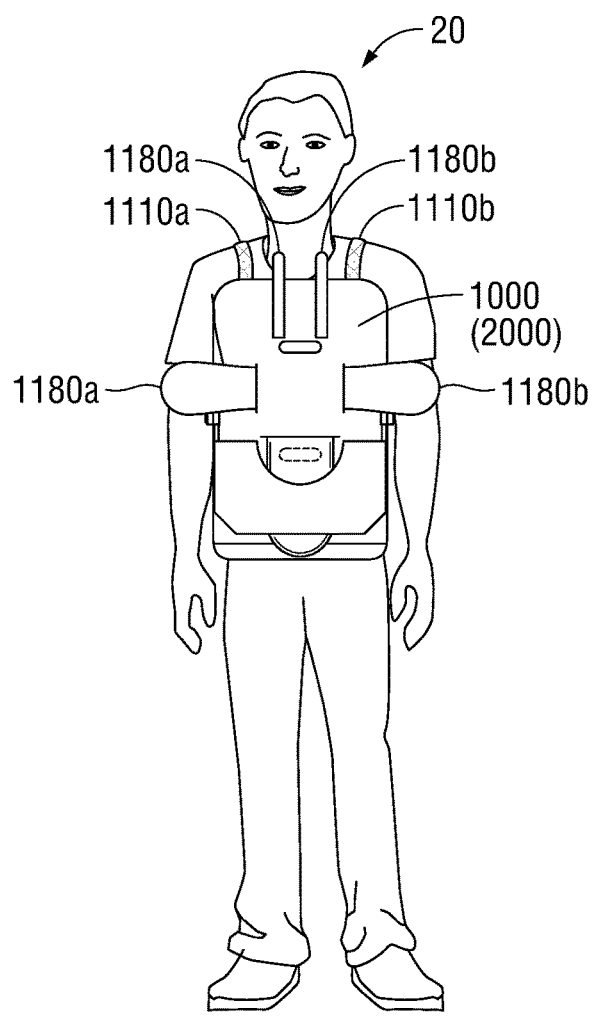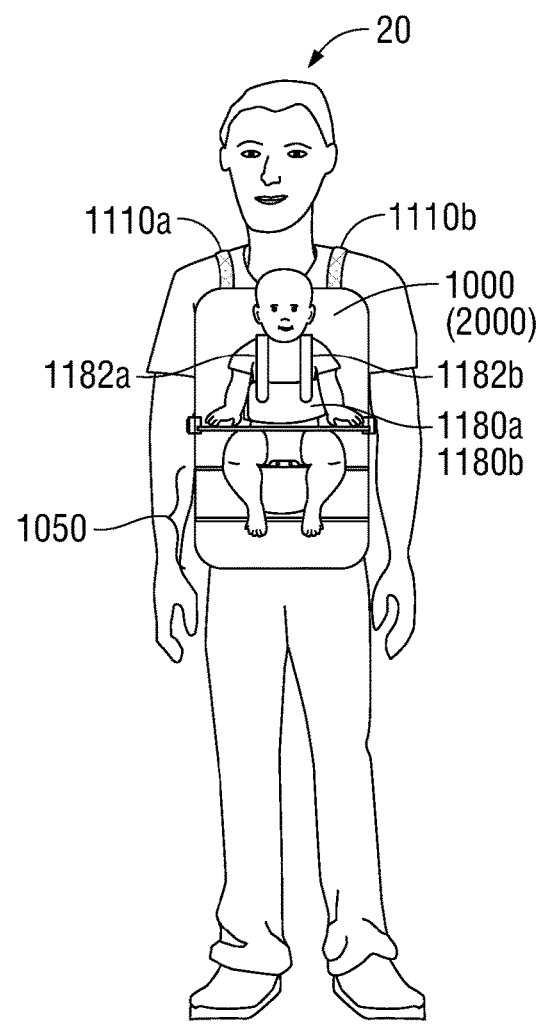
FIG. 30  FIG. 31

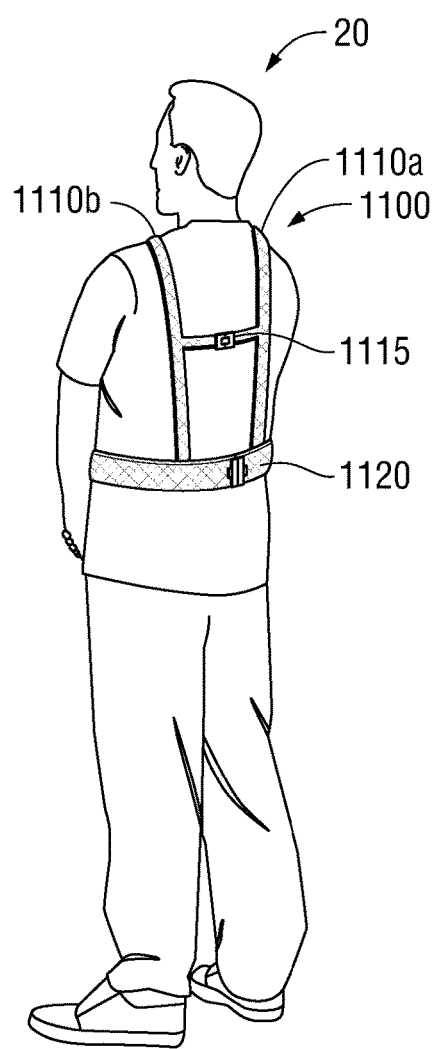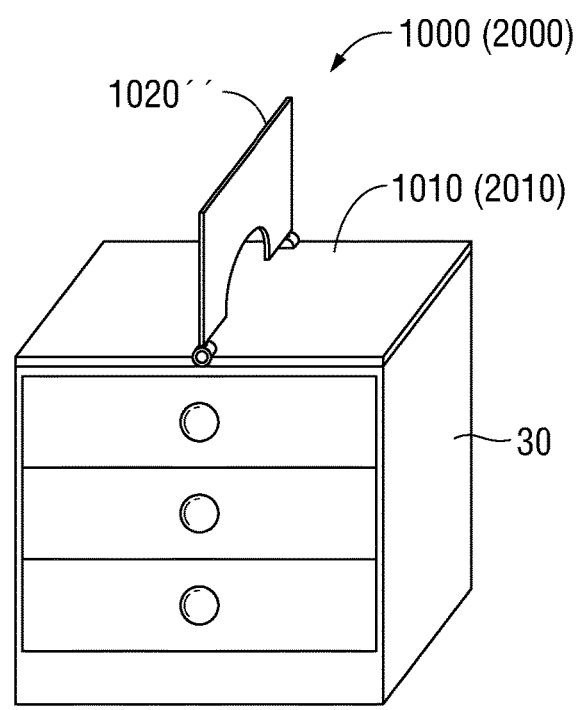
FIG. 32  FIG. 33

WEIGHT SUPPORT SYSTEMS

BACKGROUND

As infants and toddlers are brought outdoors and to locations outside of the home while the infants and toddlers must still wear diapers, the diapers require periodic changing. Changing the diaper under these circumstances can be particularly difficult as the infant or toddler is restless and often uncooperative.

Apparatuses known to be intended to address this problem do not provide many options for the parent or caregiver besides changing the diaper.

SUMMARY

The present disclosure relates to a combination diaper-changing platform and seating system that provides significant and unobvious advantages over the prior art of diaper-changing apparatuses.

More particularly, the present disclosure relates to a diaper-changing platform system that includes a platform member configured with interlocking sections The platform member is configured to enable an infant or toddler to sit on at least one interlocking section positioned to project from the platform member to define a seating position. The platform member is also configured to be positioned such that the platform member defines a generally flat surface enabling an infant or toddler to be positioned lying on the generally flat surface.

In an aspect, the platform member has first and second sides and first and second ends and is configured to enable positioning an infant or toddler thereon for changing of a diaper. The system may further include a structural frame supporting member defining a first lateral member extending longitudinally from a base member and a second lateral member extending longitudinally from the base member. The structural frame supporting member is configured to receive the platform member therein at least partially via at least two apertures formed in each of the first lateral member and the second lateral member. The at least two apertures formed in the first lateral member at least partially interface the first side of the platform member and the least two apertures formed in the second lateral member at least partially interface the second side of the platform member. The platform member is configured with interlocking sections that include connecting members that are movably positioned within the at least two apertures formed in the first lateral member and movably positioned within the at least two apertures formed in the second lateral member. The interlocking sections are configured such that at least one interlocking section can be positioned to project from the platform member to enable an infant or toddler to sit on the at least one interlocking section positioned to project from the platform member.

In another aspect, the platform member is configured with interlocking sections that include interlocking sections defining an upper section interlocking with a seating supporting section. The upper section and the seating supporting section are configured such that the upper section and the seating supporting section can be positioned via motion of the connecting members movably positioned within the at least two apertures formed in the first lateral member and motion of the connecting members movably positioned within the at least two apertures formed in the second lateral member such that the platform member defines a generally flat surface enabling an infant or toddler to be positioned lying on the generally flat surface.

In an aspect, the platform member configured in interlocking sections is configured such that at least one of the interlocking sections can be positioned behind the lower limbs of an infant or toddler while an infant or toddler is seated on the at least one of the other interlocking sections positioned to project from the platform member.

In an aspect, at least another one of the interlocking sections is configured such that the at least another one of the interlocking sections can be positioned to project from the platform member to enable the feet of an infant or toddler to rest on the at least another one of the interlocking sections while the infant or toddler is seated on the at least one of the other interlocking sections positioned to project from the platform member.

In an aspect, the seating supporting section is configured in interlocking sections such that at least one of the interlocking sections can be positioned behind the lower limbs of an infant or toddler while an infant or toddler is seated on the at least one of the other interlocking sections positioned to project from the platform member.

In another aspect, at least another one of the interlocking sections is configured such that the at least another one of the interlocking sections can be positioned to project from the platform member to enable the feet of an infant or toddler to rest on the at least another one of the interlocking sections while the infant or toddler is seated on the at least one of the other interlocking sections positioned to project from the platform member.

In still another aspect, the platform member defines an upper platform member surface and a lower platform member surface wherein the lower platform member surface defines a depression in the platform member surface which receives the seating supporting section.

In an aspect, the diaper-changing platform system may further include a partition member attachable to and detachable from the platform member. The partition member is movable from a position parallel to the platform member to a position projecting from the platform member to provide a table surface enabling the placing of objects thereon.

In an aspect, the diaper-changing platform system may further include at least two infant or toddler torso support flaps configured to be removably attachable to the platform member and to engage with one another to restrain the torso of an infant or toddler while positioned on the platform member.

In an aspect, the diaper-changing platform system may further include at least two infant or toddler shoulder support flaps configured to be removably attachable to the platform member and to removably engage respectively with the at least two infant or toddler torso support flaps to restrain the shoulders of an infant or toddler while positioned on the platform member.

In an aspect, the at least two infant or toddler torso support flaps are configured to be removably attachable to the platform member and to engage with one another to restrain the torso of an infant or toddler while seated on the at least one of the other interlocking sections positioned to project from the platform member.

In an aspect, the at least two infant or toddler shoulder support flaps are configured to be removably attachable to the platform member and to removably engage respectively with the at least two infant or toddler torso support flaps to restrain the shoulders of an infant or toddler while seated on the at least one of the other interlocking sections positioned to project from the platform member.

In an aspect, at least one infant or toddler sanitary flap is configured to be removably attachable to the platform member at a position accommodating soiling of the at least one infant or toddler sanitary flap during changing of a diaper.

In an aspect, at least one infant or toddler sanitary flap is configured to be removably attachable to the platform member and configured to overlap the seating supporting section when configured such that the seating supporting section is positioned to project from the platform member to enable an infant or toddler to sit on the at least one interlocking section positioned to project from the platform member. The at least one infant or toddler sanitary flap is configured thereby to accommodate soiling of the at least one infant or toddler sanitary flap while an infant or toddler is seated on the at least one interlocking section.

In an aspect, the partition member is configured as a generally U-shaped arch defining a center space enabling the partition member to be positioned over the torso of an infant or toddler positioned on the platform member.

In an aspect, the partition member further includes at least one compartment defining a volume of space configured to receive at least one object therein.

In an aspect, the diaper-changing platform system further includes a plurality of arch members each configured to project from the platform member, each of the arch members having one end joined at a first common position on the platform member, each of the arch members having another end joined at a second common position on the platform member.

In an aspect, at least one of the plurality of arch members rotatably moves around the first common position and around the second common position, thereby defining at least one volume of space between the platform member and the at least one of the plurality of arch members.

In an aspect, the diaper-changing platform system further includes a mesh material removably attachable to the platform member and to at least one of the plurality of arch members, thereby defining an insect protection structure for an infant or toddler positioned on the platform member within the at least one volume of space between the platform member and the at least one of the plurality of arch members.

In an aspect, the diaper-changing platform system further includes a solid material removably attachable to the platform member and to at least one of the plurality of arch members, thereby defining a weather protection structure for an infant or toddler positioned on the platform member within the at least one volume of space between the platform member and the at least one of the plurality of arch members.

In an aspect, the diaper-changing platform system further includes at least one carrier torso support flap configured to be removably attachable to the platform member to be supported by the torso of a carrier of the diaper-changing platform system, supporting thereby an infant or toddler positioned on the platform member.

In another aspect, the diaper-changing platform system further includes at least two carrier shoulder support flaps configured to be removably attachable to the platform member to contact the shoulders of the carrier of the platform member, supporting thereby an infant or toddler positioned on the platform member.

In an aspect, the at least one carrier torso support flap is configured to be removably attachable to the platform member and to be supported by the carrier of the platform member, supporting thereby the torso of an infant or toddler seated on the at least one of the other interlocking sections.

In an aspect, the at least two infant or toddler shoulder support flaps are configured to be removably attachable to the platform member and to be supported by the carrier of the platform member, supporting thereby the torso of an infant or toddler seated on the at least one of the other interlocking sections.

In an aspect, the platform member defines at least one axis of rotation enabling thereby the diaper-changing platform system to be folded around the axis of rotation for transport in a compact configuration.

In an aspect, when the interlocking sections of the platform member are configured to enable an infant or toddler to sit on at least one interlocking section positioned to project from the platform member, the diaper-changing platform system can be received in the frame of a stroller to enable an infant or toddler to sit on the at least one interlocking section to enable transporting via the stroller the diaper-changing platform system.

In yet another aspect, the diaper-changing platform system further includes a weight supporting system configured to provide support for the diaper-changing platform system when in the seating position to reduce the weight of the infant or toddler applied to the shoulders of a carrier.

In an aspect, the weight support system includes a band configured to be mounted around the waist of a carrier of the diaper-changing platform system and at least two supporting structures that are supported by the band and configured to support the diaper-changing platform system when in the seating position.

In another aspect, the weight support system includes a band configured to be mounted around the waist of a carrier of the diaper-changing platform system and at least one exoskeleton supporting structure that is supported by the band and configured to support the diaper-changing platform system when in the seating position and which further transfers force due to motion of the feet of the carrier.

In an aspect, the at least one exoskeleton supporting structure further includes a plate member. The diaper-changing platform system is configured to enable an infant or toddler to sit on at least one interlocking section positioned to project from the platform member to define a seating position, wherein the at least one interlocking section further includes a pocket configured and disposed with respect to the at least one exoskeleton supporting structure to receive the plate member, therein thereby stabilizing the exoskeleton supporting structure to the diaper-changing platform system during motion by the carrier of the diaper-changing platform system.

The present disclosure relates also to a stroller for transporting an infant or toddler that includes a frame and a diaper-changing platform system. The diaper-changing platform system includes a platform member configured with interlocking sections. The platform member is configured to enable an infant or toddler to sit on at least one interlocking section positioned to project from the platform member. The platform member is configured to be positioned such that the platform member defines a generally flat surface enabling an infant or toddler to be positioned lying on the generally flat surface. The frame of the stroller receives the diaper-changing platform system when the platform member is configured to enable an infant or toddler to sit on at least one interlocking section to enable transporting via the stroller the diaper-changing platform system.

The present disclosure relates also to weight supporting system that includes a band configured to be worn around the waist of a carrier. The band includes at least one securing device to secure at least one supporting structure. The band and the at least one supporting structure are configured to provide support to one of: a diaper-changing platform system configured such that a seating supporting section can be positioned to project from a platform member to enable an infant or toddler to sit on the seating supporting section when positioned to project from the platform member while being carried by a carrier of the diaper-changing platform system; a back pack worn on a rear torso of a carrier of the back pack; and a front pack worn on a front torso of a carrier of the front pack, or combinations thereof. The weight supporting system is thus configured to reduce the weight applied to the shoulders of a carrier of an infant or toddler seated on the seating supporting section of the diaper-changing platform system, or to reduce the weight applied to the shoulders of a carrier of the back pack or to reduce the weight applied to the shoulders of a carrier of the front pack.

In an aspect, the at least one supporting structure includes at least two supporting ribs that are supported by the band and configured to support the one of: a diaper-changing platform system configured such that a seating supporting section can be positioned to project from a platform member to enable an infant or toddler to sit on the seating supporting section when positioned to project from the platform member; a back pack worn on a rear torso of a carrier of the back pack; and a front pack worn on a front torso of a carrier of the front pack, or combinations thereof.

In an aspect, the weight support system includes at least one exoskeleton supporting structure that is supported by the band and configured to support the one of: a diaper-changing platform system configured such that a seating supporting section can be positioned to project from a platform member to enable an infant or toddler to sit on the seating supporting section when positioned to project from the platform member; a back pack worn on a rear torso of a carrier of the back pack; and a front pack worn on a front torso of a carrier of the front pack, or combinations thereof, and which further transfers force due to motion of the feet of the carrier.

In an aspect, the at least one exoskeleton supporting structure further includes at least one plate member. The one of: a diaper-changing platform system is configured such that a seating supporting section can be positioned to project from a platform member to enable an infant or toddler to sit on the seating supporting section when positioned to project from the platform member; a back pack worn on a rear torso of a carrier of the back pack; and a front pack worn on a front torso of a carrier of the front pack, or combinations thereof, further including a pocket configured and disposed with respect to the at least one exoskeleton supporting structure to receive the at least one plate member therein, thereby stabilizing during motion by the carrier the exoskeleton supporting structure to the one of: a diaper-changing platform system configured such that a seating supporting section can be positioned to project from a platform member to enable an infant or toddler to sit on the seating supporting section when positioned to project from the platform member; a back pack worn on a rear torso of a carrier of the back pack; and a front pack worn on a front torso of a carrier of the front pack, or combinations thereof.

BRIEF DESCRIPTION OF THE DRAWINGS

The above-mentioned advantages and other advantages will become more apparent from the following detailed description of the various exemplary embodiments of the present disclosure with reference to the drawings wherein:

FIG. 9A is a side view of the diaper-changing platform system of FIGS. 1-6 showing the partition member in a position parallel to the platform member;

FIG. 9B is a side view of the diaper-changing platform system of FIG. 9A showing the partition member in a position projecting from the platform member prior to being fully engaged;

FIG. 9C is a side view of the diaper-changing platform system of FIGS. 9A-9B showing the partition member in a position projecting from the platform member after being fully engaged;

FIG. 9D is a side view of an alternate embodiment of the diaper-changing platform system of FIGS. 1-6 showing the partition member in a position parallel to the platform member;

FIG. 9E is a side view of the alternate embodiment of the diaper-changing platform system of FIG. 9D showing the partition member in a position projecting from the platform member prior to being fully engaged;

FIG. 9F is a side view of the alternate embodiment of the diaper-changing platform system of FIGS. 9D-9E showing the partition member in a position projecting from the platform member after being fully engaged;

FIG. 17A is a side view of the diaper-changing platform system of FIGS. 1-6 and FIGS. 9A-9C showing the structural frame member in a position parallel to the platform member;

FIG. 17B is a side view of the diaper-changing platform system of FIG. 17A showing an interlocking section of the platform member in a position projecting from an upper interlocking section of the platform member while other interlocking sections of the platform member are projecting at an angle of 90° from the section projecting from the upper interlocking section of the platform member;

FIG. 17C is a side view of the diaper-changing platform system of FIGS. 17A-17B showing one of the other interlocking sections of the platform member now in a position projecting from the platform member in a direction parallel to the direction at which the interlocking section of the platform member in FIG. 17B projects from the platform member to enable seating of an infant or toddler thereon, wherein the fold out seat sections could be held in place to support an infant or toddler sitting on it;

FIG. 17D is a side view of an alternate embodiment of the diaper-changing platform system of FIGS. 1-6 and FIGS. 9D-9F showing a supporting member in a position parallel to the platform member;

FIG. 17E is a side view of the alternate embodiment of the diaper-changing platform system of FIG. 17D showing a section of the supporting member in a position projecting from the platform member while other sections of the supporting member are projecting at an angle of 90° from the section projecting from the platform member;

FIG. 17F is a side view of the alternate embodiment of the diaper-changing platform system of FIGS. 17D-17E showing one of the other sections of the supporting member now in a position projecting from the platform member in a direction parallel to the direction at which the section of the supporting member in FIG. 11B projects from the platform member to enable seating of an infant or toddler thereon, wherein the fold out seat sections could be held in place to support an infant or toddler sitting on it;

FIG. 23 is a frontal view of the diaper-changing platform system illustrating the movements of the torso support flaps and the shoulder straps and the movement of an infant or toddler sanitary flap that is removably attachable to the platform member and that is configured to overlap the supporting member;

FIG. 24 is a frontal view of the diaper-changing platform system illustrating the sanitary flap removed from the platform member;

FIG. 25A is a side view of the diaper-changing platform system folded into a compact configuration;

FIG. 25B is an end view of the diaper-changing platform system of FIG. 25A folded into a compact configuration;

FIG. 30 illustrates a carrier of the diaper-changing platform system wherein the carrier is supporting the diaper-changing platform system via at least two shoulder straps supported by the carrier and attached to the diaper-changing platform system;

FIG. 31 illustrates the carrier of the diaper-changing platform system of FIG. 30 and further illustrating an infant or toddler seated on the supporting member of the diaper changing platform system;

FIG. 32 illustrates a rear view of the carrier of the diaper-changing platform system of FIGS. 30 and 31 and further illustrating a shoulder and torso harness configured around the carrier to support the diaper-changing platform system and an infant or toddler seated on the supporting member of the diaper changing platform system;

FIG. 33 illustrates another aspect of the diaper-changing platform system positioned on furniture and including another aspect of the partition member;

DETAILED DESCRIPTION

Figure 1:
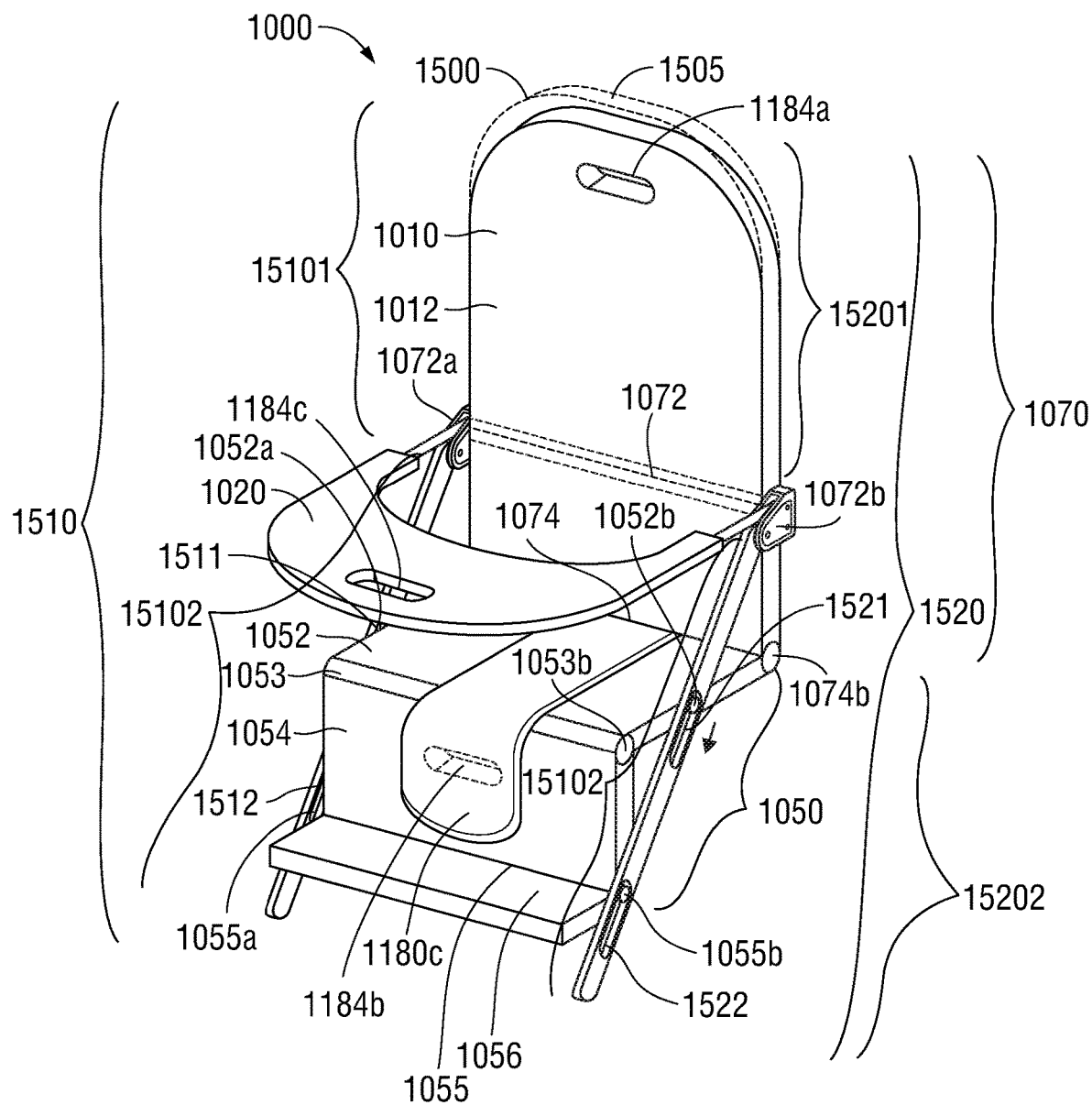
FIG. 1 illustrates a diaper-changing platform system according to embodiments of the present disclosure that includes a structural frame supporting member that receives a platform member configured to enable positioning the platform member to enable an infant or toddler to sit on an interlocking section of the platform member that is positioned to project from the platform member, and also enabling positioning of the platform member to define a generally flat surface enabling an infant or toddler to be positioned lying on the generally flat surface.

The embodiments of the present disclosure provide significant and unobvious advantages in addressing the foregoing undesirable consequences by relating to a portable diaper-changing platform system that enables carrying of an infant or toddler in a seated position on a supporting member and positioning of a partition member during carrying of the infant or toddler and during changing of a diaper to reduce spread of soiling while also enabling positioning of materials enabling insect protection and weather protection over the infant or toddler.

As defined herein, an infant or toddler refers to a child whose weight is below structural limits of the diaper-changing platform system and its individual components that are further described herein. The diaper-changing platform system of the present disclosure may also be applied to children who no longer require diapers for the purposes of transporting such children as long as the weight of such children is within the structural limits of the diaper-changing platform system as designed and within the ability of a carrier of the diaper-changing platform system.

As defined herein, a carrier is any person, male or female, including those such as a parent, guardian, caregiver, relative, friend of a parent, medical, law enforcement or emergency services personnel, etc., who may operate the diaper-changing system or obvious variations thereof for the purposes as described herein.

Application of the diaper-changing platform system is not limited to humans and may also be applied to animals such as dogs, cats, micro pigs, etc., particularly for the purposes of transporting said animals and the structural design limits of the diaper-changing platform system and the ability of a carrier are also considered.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" may be used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

Accordingly, FIG. 1 illustrates a diaper-changing platform system 1000 according to embodiments of the present disclosure that includes a platform member 1010 that is configured to enable positioning the platform member 1010 to enable an infant or toddler to sit on an interlocking section of the platform member that is positioned to project from the platform member and also enabling positioning of the platform member to define a generally flat surface 1012 enabling an infant or toddler to be positioned lying on the generally flat surface 1012.

As defined herein, directions such as "left" and "right" are with respect to the view by an infant or toddler whose rear side is positioned on platform member front surface 1012 and positioned face forward looking away from platform member front surface 1012.

Also, directions such as "upper" are with respect to the location of a head of an infant or toddler positioned on platform member front surface 1012 and directions such as "lower" are with respect to the location of the feet of an infant or toddler positioned on platform member front surface 1012. Such terminology applies for the purposes of facilitating description of the embodiments of the present disclosure even when the platform member 1010 is positioned generally horizontally and flat, such as when an infant or toddler is lying on the front surface 1012.

The platform member 1010 includes an upper interlocking section 1070 and a seating supporting section 1050 that are configured to interlock with one another.

The platform member 1010 is receivable in a structural frame supporting member 1500 that defines a first lateral member 1510 that extends longitudinally from a base member 1505 and a second lateral member 1520 that also extends longitudinally from the base member 1505.

Figure 2A:
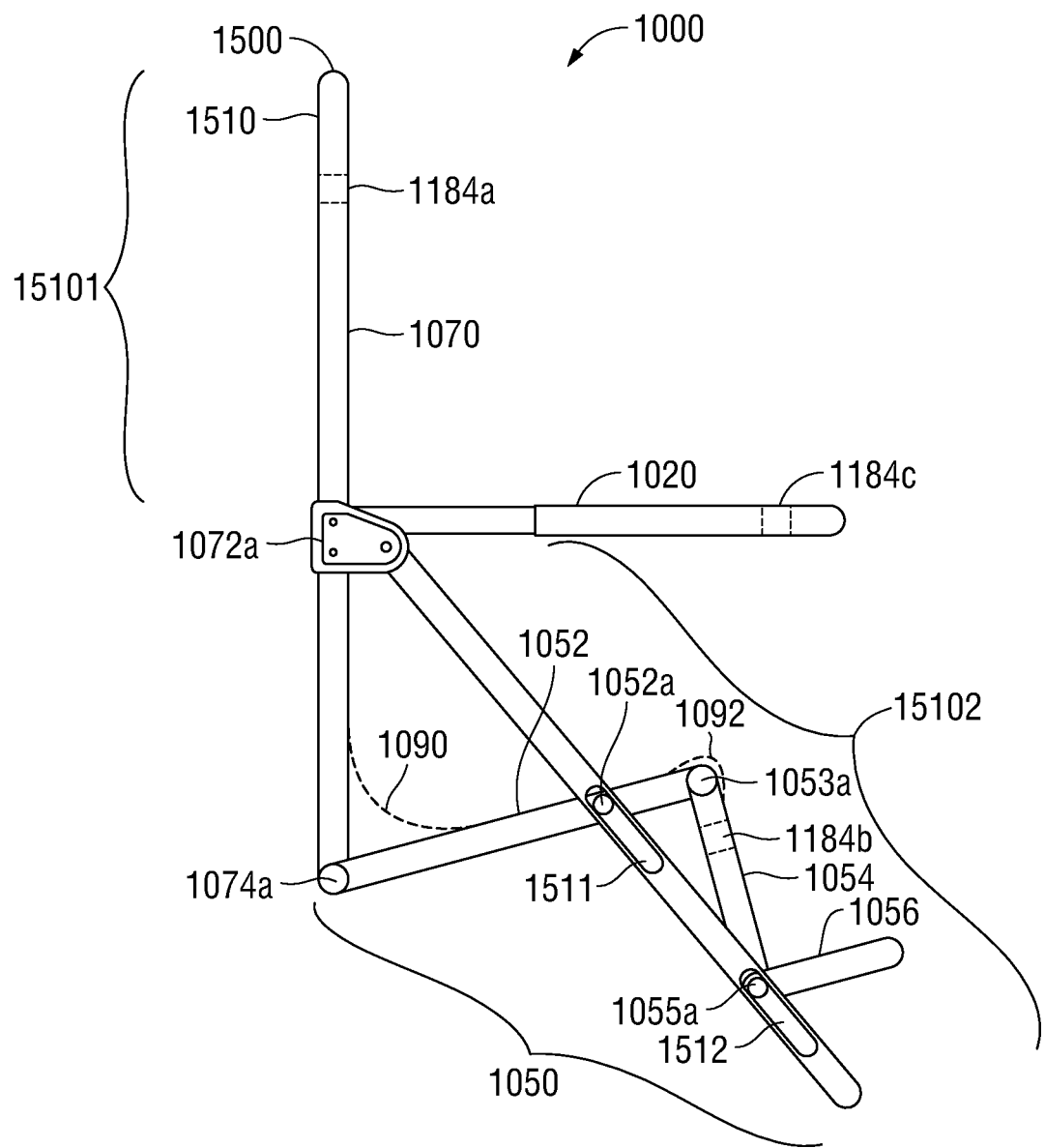
FIG. 2A is a right side elevation view of the diaper-changing platform system of FIG. 1 illustrating the platform system configured to enable an infant or toddler to sit on one interlocking section positioned to project from the platform member.
Figure 2B:
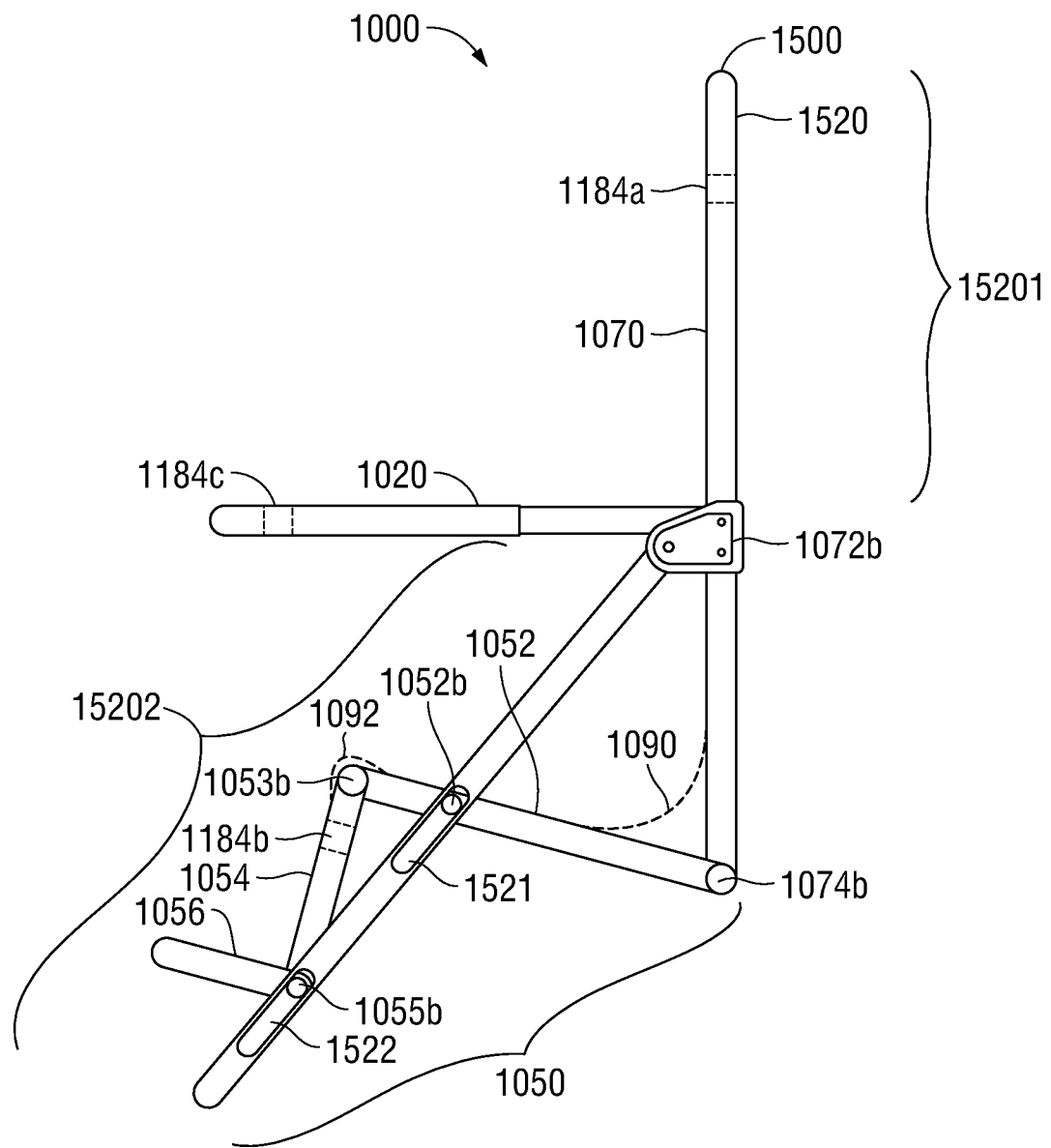
FIG. 2B is a left side elevation view of the diaper-changing platform system of FIG. 1 on an opposing side of the diaper-changing platform system as illustrated in FIG. 2A and illustrating the platform system configured to enable an infant or toddler to sit on one interlocking section positioned to project from the platform member.
Figure 3:
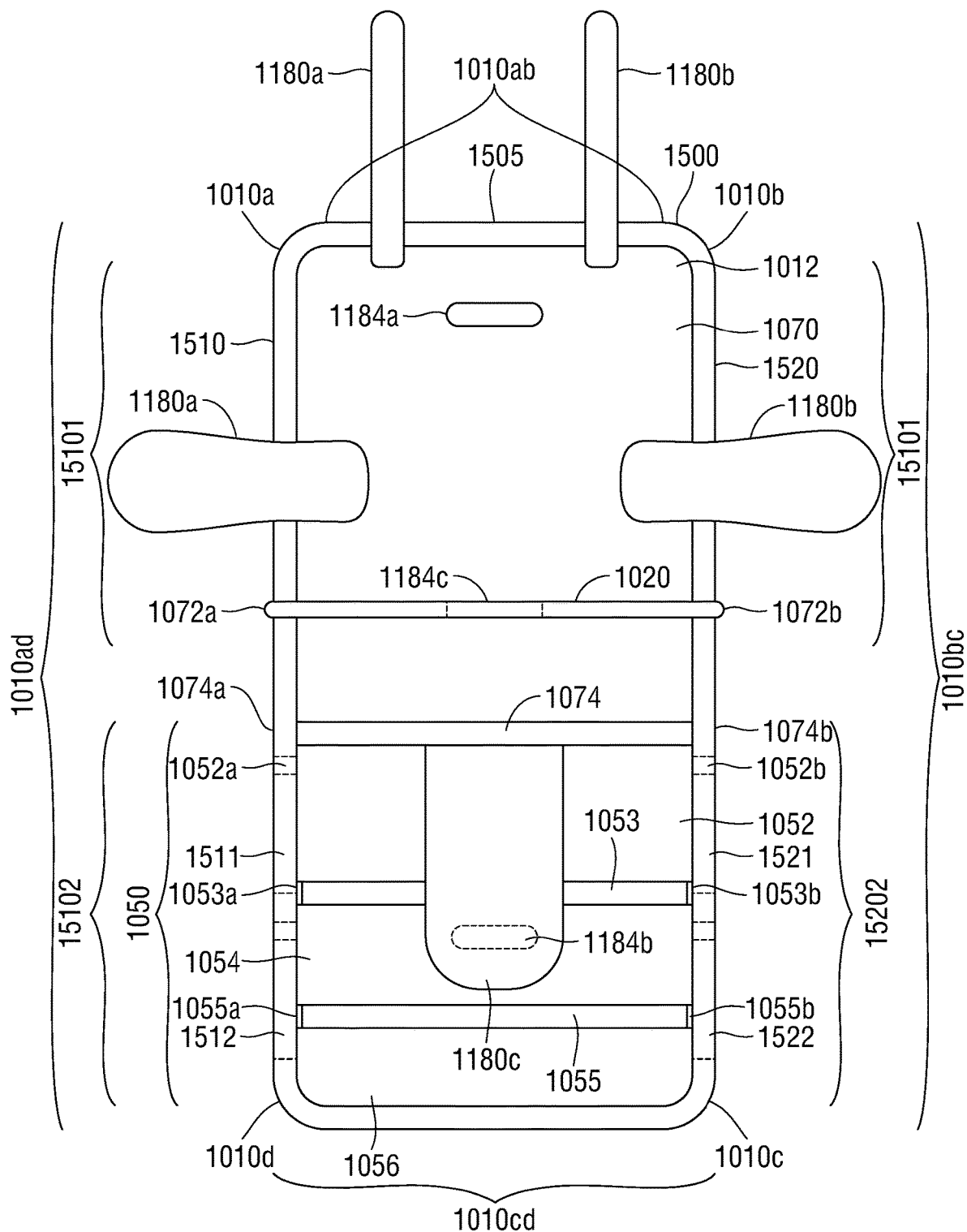
FIG. 3 is a frontal view of the diaper-changing platform system illustrating the torso support flaps and shoulder straps and a sanitary flap that is removably attachable to the platform member.

As further illustrated in conjunction with FIGS. 2A, 2B and 3, the platform member 1010 may be generally configured in the form of a rectangular plate with rounded corners 1010*a*, 1010*b*, 1010*c* and 1010*d*. Lower edge 1010*cd* of platform member 1010 extends between rounded corners 1010*c* and 1010*d*. Upper edge 1010*ab* extends between rounded corners 1010*a* and 1010*b*.

Accordingly, right or first lateral side 1010*ad* of platform member 1010 extends between rounded corners 1010*a* and 1010*d* while left or second lateral side 1010*bc* of platform member 1010 extends between rounded corners 1010*b* and 1010*c*.

As best viewed in FIGS. 2A, 2B and 3, the structural frame supporting member 1500 is configured to receive the platform member 1010 therein at least partially via at least two apertures 1511, 1512 and 1521, 1522 formed in each of the first lateral member 1510 and the second lateral member 1520, respectively. The apertures 1511 and 1512 are formed in the first lateral member 1510 at least partially interfacing the first lateral side 1010*ad* of the platform member 1010 while the apertures 1521 and 1522 are formed in the second lateral member 1520 at least partially interfacing the second lateral side 1010*bc* of the platform member 1010.

The platform member 1010 is configured to include an upper interlocking section 1070 that forms a portion of first lateral side 1010*ad* that remains aligned with first lateral member 1510, a portion of upper edge 1010*ad* that remains aligned with base member 1505, and a portion of second lateral side 1010*bc* that remains aligned with second lateral member 1520. The platform member 1010 is further configured to include a seating supporting section 1050 that is configured to include at least two interlocking sub-sections 1052 and 1054 that are rotatably joined via connection 1053 extending from a right or first lateral end 1053*a* on first lateral side 1010*ad* to a left or second lateral end 1053*b* on second lateral side 1010*bc*. The interlocking sub-section 1052 includes connecting members 1052*a* and 1052*b* that are positioned on first lateral side 1010*ad* and second lateral side 1010*bc*, respectively, and are movably positioned within the first aperture 1511 formed in the first lateral member 1510 and within the second aperture 1512 formed in the second lateral member 1520, respectively. The interlocking sub-section 1054 may be rotatably joined via connection 1055 extending from a right or first lateral end connecting member 1055*a* on first lateral side 1010*ad* to a left or second lateral end connecting member 1055*b* on second lateral side 1010*bc*. The right or first lateral end connecting member 1055*a* and the left or second lateral end connecting member 1055*b* are movably positioned within the first aperture 1521 and second aperture 1522 formed in lower portions 15102 and 15202 of first lateral member 1510 and second lateral member 1520 respectively.

The upper interlocking section 1070 and the seating supporting section 1050 are rotatably joined to one another via the connecting members 1074*a* and 1074*b* that are mounted on first lateral side 1010*ad* and second lateral side 1010*bc*, respectively, of the platform member 1010.

The first lateral member 1510 and the second lateral member 1520 each include an upper portion 15101 and 15201 that are mounted to the upper interlocking section 1070 on first lateral side 1010*ad* and second lateral side 1010*bc*, respectively, extending from the base member 1505 to pivoting rotation joints 1072*a* and 1072*b* where lower portions 15102 and 15202 of first lateral member 1510 and second lateral member 1520, which include the apertures 1521 and 1522, respectively, are pivotally joined to the pivoting rotation joints 1072*a* and 1072*b*, respectively, thereby enabling motion of the upper interlocking section 1070 and the seating supporting section 1050 within the volume of space defined between the lower portions 15102 and 15202. The lower portions 15102 and 15202 of the first lateral member 1510 and second lateral member 1520 extend sufficiently in distance away from first lateral member 1510 and second lateral member 1520 to enable motion of the connecting members 1052*a* and 1055*a* within apertures 1511 and 1512 formed in the first lateral member 1510 and to enable motion of the connecting members 1052*b* and 1055*b* within apertures 1521 and 1522 formed in the second lateral member 1520.

The interlocking sub-sections 1052 and 1054 are configured such that at least one of the interlocking sub-sections, e.g., sub-section 1052, can be positioned, via motion of the connecting members 1052*a* and 1055*a* movably positioned within the apertures 1511 and 1512 formed in the first lateral member 1510 and via motion of the connecting members 1052*b* and 1055*b* movably positioned within the apertures 1521 and 1522 formed in the second lateral member 1520 to project from the upper interlocking section 1070 of platform member 1010, respectively, to enable an infant or toddler to sit on the interlocking sub-section 1052 that is now positioned to project from the upper interlocking section 1070 of platform member 1010.

In addition, the interlocking sub-sections 1052 and 1054 are configured such that the interlocking sub-sections 1052 and 1054 can be positioned, via motion of the connecting members 1052*a* and 1055*a* movably positioned within the apertures 1511 and 1512 formed in the first lateral member 1510 and via motion of the connecting members 1052*b* and 1054*b* movably positioned within the apertures 1521 and 1522 formed in the second lateral member 1520 to project from the upper interlocking section 1070 of platform member 1010, respectively, such that the front surface 1012 of platform member 1010 defines a generally flat surface enabling an infant or toddler to be positioned lying on the generally flat surface.

Therefore, the seating supporting section 1050 is configured to include at least interlocking sub-sections 1052 and 1054 wherein at least one interlocking sub-section 1052 can be positioned to project from the upper interlocking section 1070 of platform member 1010 to enable an infant or toddler to sit on the interlocking sub-section 1052.

Further, the seating supporting section 1050 of the platform member 1010 may be configured in at least three interlocking sub-sections 1052, 1054 and 1056 such that at least another one of the interlocking sub-sections, e.g., sub-section 1054, can be positioned behind the lower limbs of an infant or toddler while an infant or toddler is seated on the one other interlocking sub-section, e.g., sub-section 1052, positioned to project from the platform member 1010.

At least another one of the interlocking sub-sections, e.g., sub-section 1056, is configured such that the sub-section 1056 can be positioned to project from the platform member 1010 to enable the feet of an infant or toddler to rest thereon while the infant or toddler is seated on at least one of the other interlocking sub-sections, e.g., sub-section 1052, positioned to project from the platform member 1010.

Figure 7:
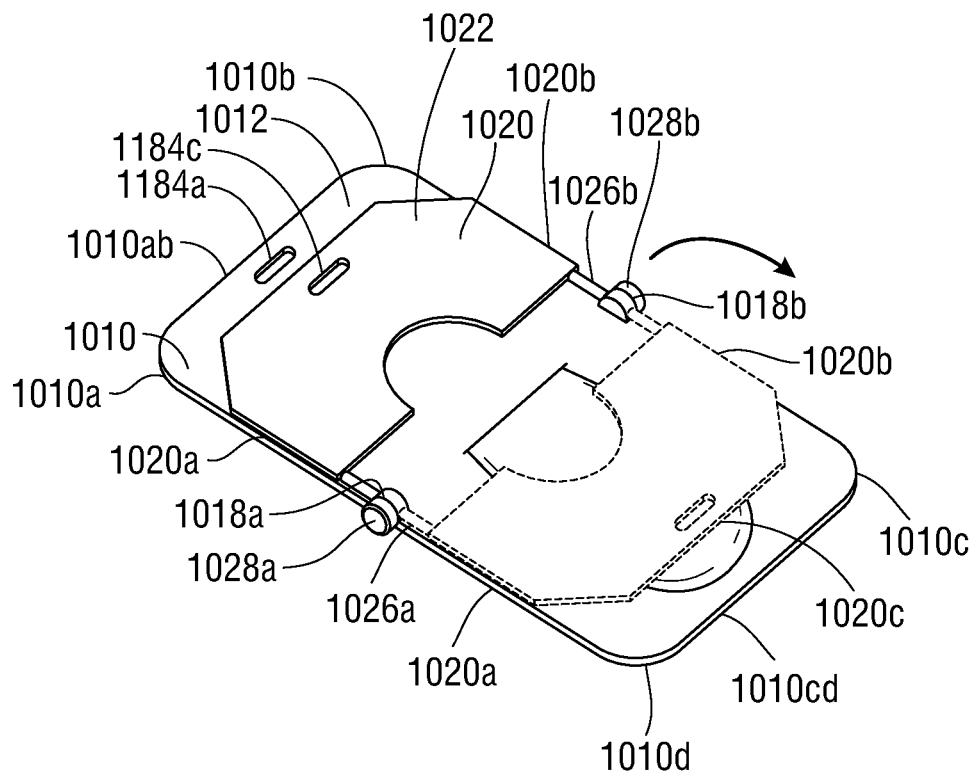
FIG. 7 illustrates the diaper-changing platform system that includes a partition member attachable to and detachable from the platform member, wherein the partition member is shown at a position parallel to the platform member.
Figure 8:
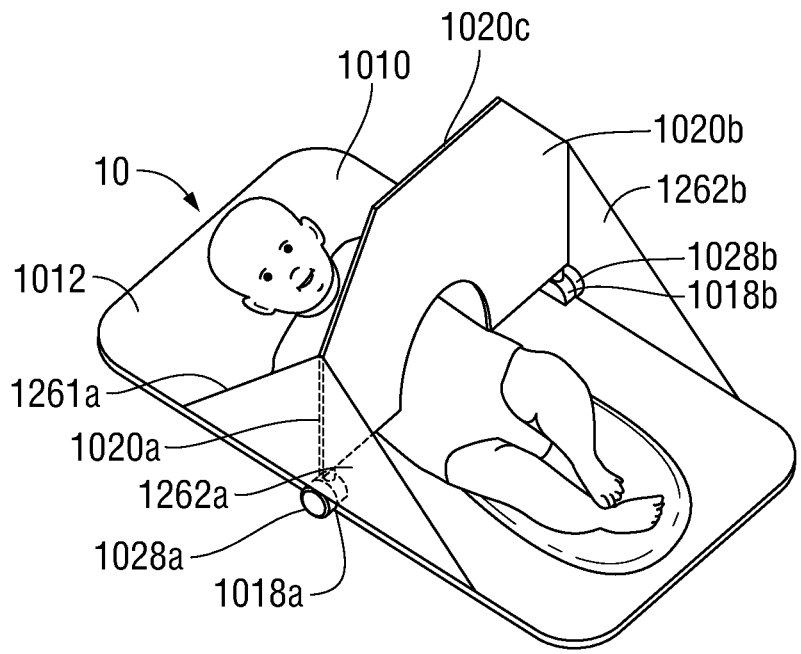
FIG. 8 illustrates the diaper-changing platform system of FIG. 7 wherein the partition member is shown at a position projecting from the platform member to provide a table surface enabling the placing of objects thereon and to serve as a partition during changing of a diaper.

In conjunction with FIG. 3 and as further described in FIGS. 7 and 8, the diaper-changing platform system 1000 may further include a partition member 1020 that is attachable to and detachable from the platform member 1010. The partition member 1020 is movable from a position parallel to the platform member 1010 to a position projecting from the platform member 1010 to provide a table surface enabling the placing of objects thereon.

As also illustrated in FIGS. 1 and 2A and 2B, the diaper-changing platform system 1000 may further include manual or harness support apertures or hand holes, e.g., apertures 1184*a* defined in the upper interlocking section 1070 in the vicinity of base member 1505, aperture 1184*b* defined for example in either the interlocking sub-section 1054 as shown or in the interlocking sub-section 1056, and an aperture 1184*c* defined in partition member 1020. The apertures 1184*a*, 1184*b* and 1184*c* enable, either alone or in combination, lifting of the diaper-changing platform system 1000 by a carrier of the system.

FIG. 3 is a frontal view of the diaper-changing platform system 1000 illustrating torso support flaps 1180*a* and 1180*b* and shoulder straps 1182*a* and 1182*b* that are attached to upper interlocking section 1070 of platform member 1010 and a sanitary flap 1180*c* that is removably attachable to the seating supporting section 1050 of platform member 1010. The partition member 1020 is extended orthogonally from the platform member 1010. The supporting frame member 1500 is shown on the periphery of the platform member 1010.

The diaper-changing platform system 1000 may be manufactured or assembled generally with durable plastic such as, merely for example but not limited to, polyvinyl chloride (PVC) foam sheet or polyolefin, or other material, including recyclable or recycled material deemed suitable by those skilled in the art including material used for platforms or marine applications.

The sanitary flap 1180*c* may be made from, but not limited to, materials utilized for diaper pads with plastic linings or the like.

Figure 4:
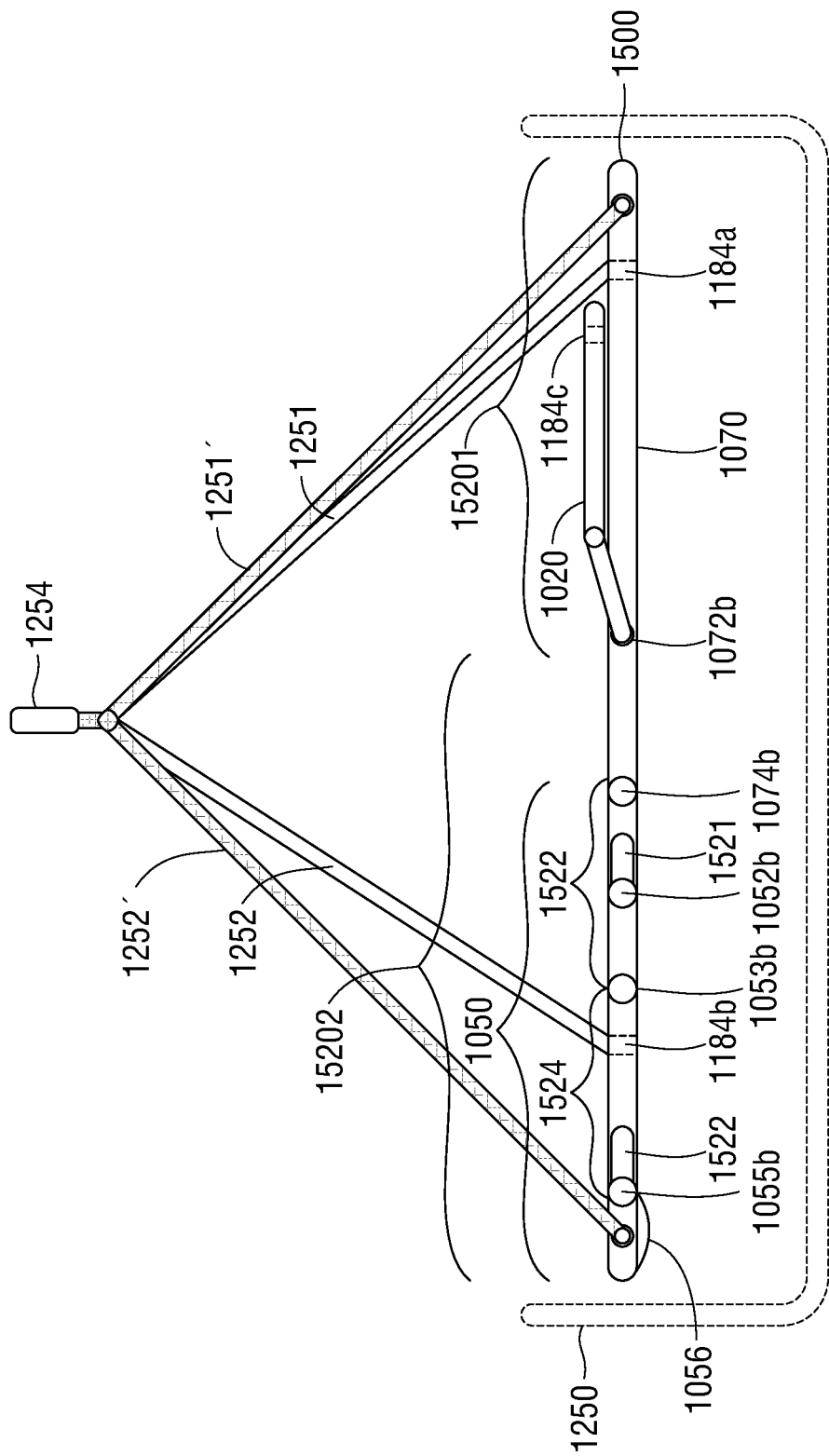
FIG. 4 is a side elevation view of the diaper-changing platform system in a horizontal flat position including straps and a handle and positioned within a carriage.

FIG. 4 is a side elevation view of the diaper-changing platform system 1000 in a horizontal flat position wherein the partition member 1020 including straps and a handle and positioned within a carriage 1250 (shown in dashed lines). More particularly, straps 1251 may be attached through manual or harness support aperture or hand hole 1184*a* defined in the upper interlocking section 1070 while straps 1252 may be attached through manual or harness support aperture or hand hole 1184*b* defined in the seating supporting section 1050. The straps 1251 and 1252 may be commonly joined via a handle 1254 to facilitate transport and lifting of the diaper-changing platform system 1000 by a carrier when not mounted to the carrier.

Figure 5:
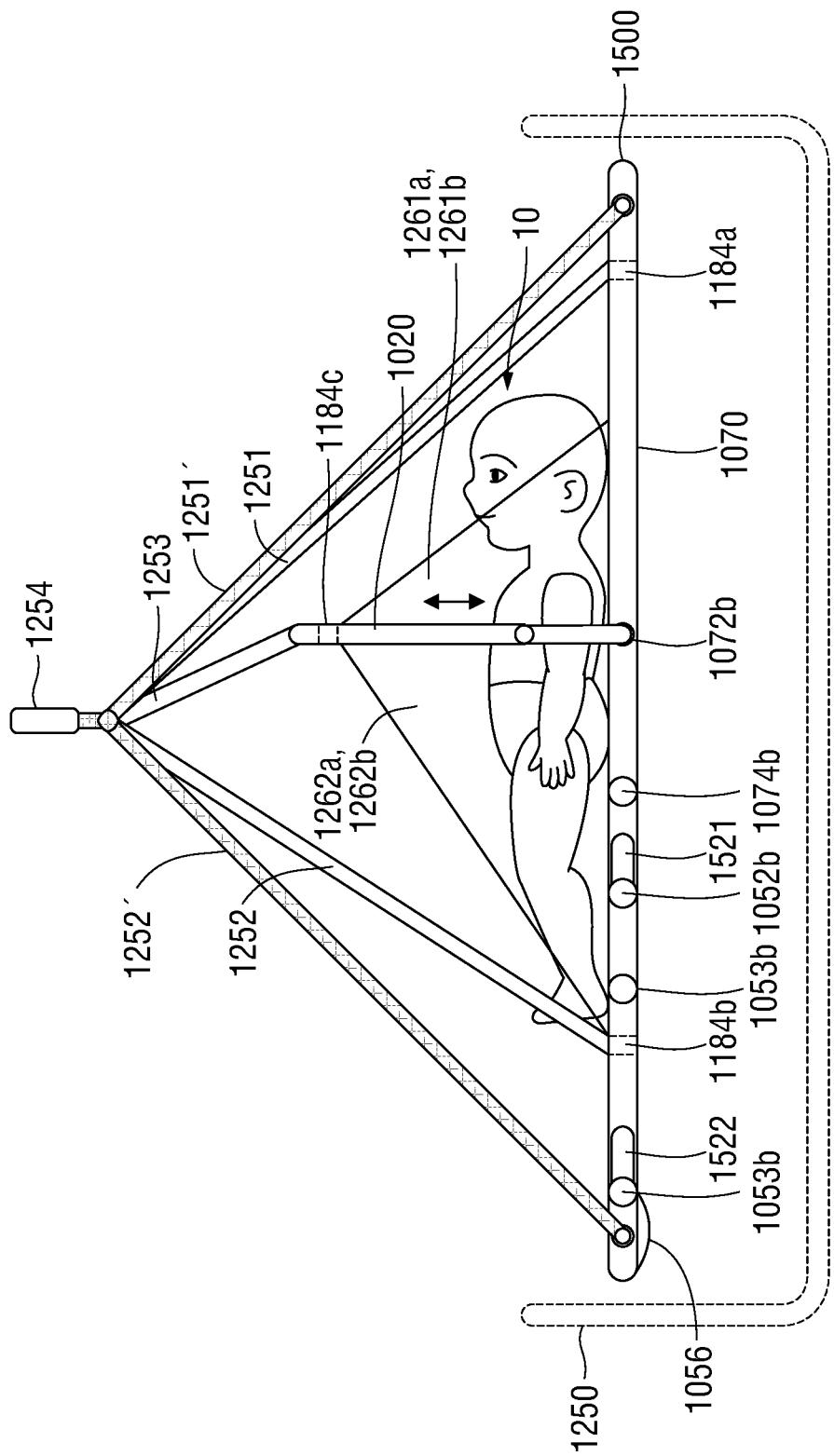
FIG. 5 is another side elevation view of the diaper-changing platform system in the horizontal flat position of FIG. 5 wherein an infant or toddler is shown lying on the platform member and further including an additional strap attached to a partition member that is in a position extending from the platform member.

FIG. 5 is another side elevation view of the diaper-changing platform system 1000 in the horizontal flat position of FIG. 5 wherein an infant or toddler 10 is shown lying on the platform member 1010 while in the flat position and further including an additional strap 1253 that is attached to partition member 1020. The partition member 1020 is in a position extending from the platform member 1010. The straps 1251, 1252 and 1252 may be commonly joined via handle 1254. In this configuration, the system 1000 is further illustrated with triangularly-shaped side guards or flaps 1261*a*, 1261*b*, 1262*a*, 1262*b* wherein side guards 1261*a* and 1262*a* are positioned on first lateral side 1010*ad* between the partition member 1020 and the upper interlocking section 1070 and between the partition member 1020 and the seating supporting section 1050, while side guards 1261*b* and 1262*b* are positioned on second lateral side 1010*bc* between the partition member 1020 and the upper interlocking section 1070 and between the partition member 1020 and the seating supporting section 1050, respectively.

Figure 6:
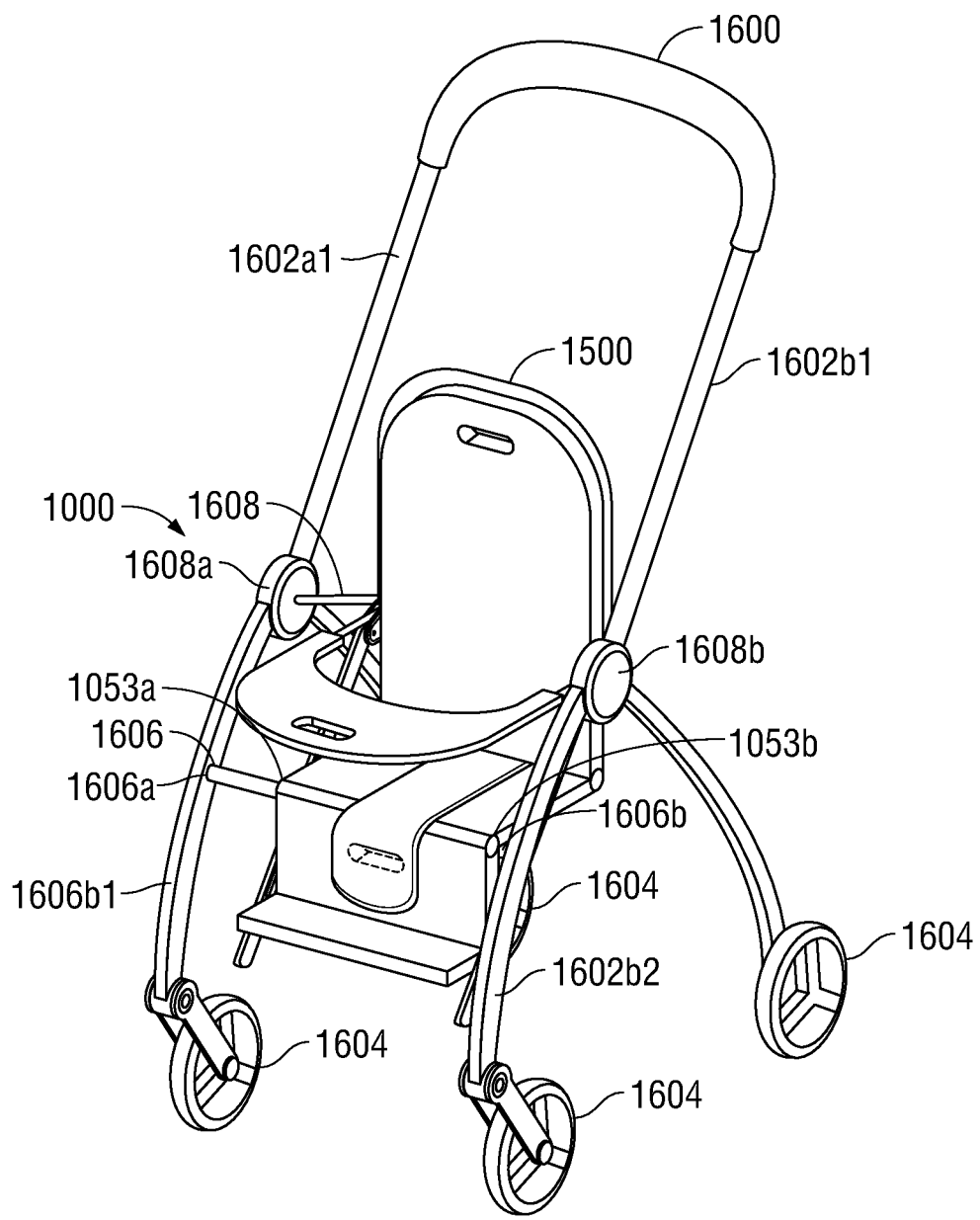
FIG. 6 illustrates the diaper-changing platform system configured to enable positioning the platform member to enable an infant or toddler to sit on an interlocking section of the platform member that is positioned to project from the platform member wherein the diaper-changing platform system is positioned within a stroller for transport of the diaper-changing platform system.

FIG. 6 illustrates the diaper-changing platform system 1000 in the position of FIGS. 1 and 2 configured to enable an infant or toddler to sit on interlocking sub-section 1052 wherein the diaper-changing platform system 1000 is positioned within the frame 1602 of a stroller 1600 for transport of the diaper-changing platform system 1000. The stroller 1600 is shown merely for example and could be a collapsible type of stroller or a rigid type and may further be a multiple child transport type stroller. The stroller 1600 generally will also include wheels 1604.

In the example of FIG. 6, the diaper-changing platform system 1000 is in a position to enable an infant or toddler to sit on the seating section 1050 and is illustrated wherein the platform member 1010 is significantly narrower than the stroller frame 1602, as would be expected generally as the size and weight of the diaper-changing platform system 1000 must be considered together with the size and weight of the infant or toddler for a carrier to carry both the system 1000 and the infant or toddler.

In view thereof, for the example of the stroller 1600, the stroller frame 1602 includes a right lateral upper segment 1602*a*1 and a left lateral upper segment 1602*b*1. The right lateral upper segment 1602*a*1 is joined to a right lateral lower segment 1602*a*2 via a rotatable joint 1608*a* while the left lateral upper segment 1602b1 is joined to a left lateral lower segment 1602b2 via a rotatable joint 1608b.

For support of the system 1000 within the stroller 1600, an upper brace 1608 may extend across the stroller frame 1602 between the rotatable joint 1608a and the rotatable joint 1608b and may interface with pivoting rotation joints 1072a and 1072b via means known in the art to support the system 1000 with an infant or toddler sitting thereon.

A lower brace 1606 may similarly extend across the stroller frame 1602 from right lateral lower segment 1602a2 to left lateral lower segment 1602b2 and may interface with right or first lateral end 1053a on first lateral side 1010ad left or second lateral end 1053b on second lateral side 1010bc of connection 1053 when the platform 1010 is in the seating configuration and is placed into the stroller 1600.

It can be understood that the width of the diaper-changing platform system as represented by the dimension of upper edge 1010ab that extends between rounded corners 1010a and 1010b and of lower edge 1010cd that extends between rounded corners 1010c and 1010d may be increased if desired to generally match or fit closely the width of the stroller frame 1602.

FIG. 7 illustrates the diaper-changing platform system 1000 without, for the purposes of simplicity of illustration, the structural frame supporting member 1500. As can be understood, platform member 1010 is configured to enable positioning an infant or toddler for changing of a diaper and the diaper-changing platform system 1000 includes the partition member 1020 that is attachable to and detachable from the platform member 1010, wherein the partition member 1020 is shown at a position parallel to the platform member 1010. As described above with respect to FIG. 3, platform member 1010 is generally configured in the form of a rectangular plate with rounded corners 1010a, 1010b, 1010c and 1010d.

As described in further detail below, the partition member 1020 is attachable to and detachable from the platform member 1010 and is movable in the direction of arrow A from a position parallel to the platform member 1010, as shown in FIG. 7, to a position projecting from the platform member 1010 to provide a table surface 1022 enabling the placing of objects thereon. The partition member 1020 is generally configured as an arc or an arch forming a center space 1024 that enables positioning the partition member 1020 around an infant or toddler positioned on the platform member 1010.

Partition member 1020 includes a right arm member 1026a extending generally parallel to right edge 1020a of the platform member 1020 and which is connected to a right position interlocking receptacle member 1028a. The partition member 1020 further includes a corresponding left arm member 1026b extending generally parallel to left edge 1020b of the platform member 1020 and which is connected to a left position interlocking receptacle member 1028b.

As described above in FIGS. 1-6, the platform member 1010 and the partition member 1020 may further include manual or harness support apertures or hand holes 1184a, 1184b and 1184c which are not further discussed herein.

As further described below with respect to FIGS. 10-14B, the platform member 1010 includes a right position interlocking engaging member 1018a that engages with right position interlocking receptacle member 1028a and a corresponding left position interlocking engaging member 1018b that engages with left position interlocking receptacle member 1028b.

FIG. 8 illustrates the diaper-changing platform system 1000 of FIG. 7 wherein the partition member 1020 has been rotated in the direction of arrow A in FIG. 7 and thus is shown at a position projecting from the platform member 1010 to provide the table surface 1022 enabling the placing of objects thereon and to serve as a partition during changing of a diaper. An infant or toddler 10 is shown positioned on platform member surface 1012 and within the center space 1024 formed by the arc or arch of the partition member 1020.

FIG. 9A is a side view of the diaper-changing platform system 1000. The platform member 1010 is configured to include upper interlocking section 1070 and seating supporting section 1050 in the lower portion of the platform member 1010. The partition member 1020 is in a position parallel to the upper interlocking section 1070. Seating supporting section 1050 extends generally from the right position interlocking engaging member 1018a and from the left position interlocking engaging member 1018b and towards lower edge 1010cd of platform member 1010 that extends between rounded corners 1010c and 1010d. Upper edge 1010ab extends between rounded corners 1010a and 1010b. A shoulder and torso harness 1100 for the diaper-changing platform system 1000 is further described below with respect to FIGS. 30-32. The shoulder and torso harness 1100 includes a right shoulder strap 1110a connected to a carrier torso strap 1120 that is removably attachable to and detachable from the platform member 1010.

FIG. 9B is a side view of the diaper-changing platform system 1000 showing the partition member 1020 in a position projecting from the platform member 1010 prior to being fully engaged, i.e., positioned at an extended distance d1 from the platform member surface 1012. The seating supporting member 1050 is shown extending generally from the right position interlocking engaging member 1018a and from the left position interlocking engaging member 1018b and towards lower edge 1010cd of platform member 1010 that extends between rounded corners 1010c and 1010d.

FIG. 9C is a side view of the diaper-changing platform system 1000 showing the partition member 1020 in a position projecting from the platform member 1010 after being fully engaged, i.e., having been moved to a minimum distance d2 from the platform member surface 1012.

FIGS. 9D-9F illustrate an alternate embodiment of the diaper-changing platform system 1000 wherein diaper-changing platform 2000 is particularly illustrated in FIGS. 9D-9F.

FIG. 9D is a side view of the alternate embodiment 2000 of the diaper-changing platform system. The platform member surface 2012 of platform member 2010 defines an upper platform member surface 2012' and a lower platform member surface 2012".

The partition member 2020 is in a position parallel to the platform member surface 2012 and more particularly overlaps lower platform member surface 2012". Lower platform member surface 2012" defines a depression in the platform member surface 2012 which receives a seating supporting section 2050 that extends generally from right position interlocking engaging member 2018a and from the left position interlocking engaging member 2018b and towards lower edge 2010cd of platform member 2010 that extends between rounded corners 2010c and 2010d. In a similar manner as with respect to right position interlocking engaging member 1018a and right position interlocking receptacle member 1028a (and left position interlocking engaging member 1018b and left position interlocking receptacle member 1028b), the platform member 2010 is rigidly connected to right arm member 2026a and left arm member 2026b of partition member 2020 via right position interlocking receptacle member 2028a. Upper edge 2010ab extends between rounded corners 2010a and 2010b. In a similar manner as with respect to diaper-changing platform system 1000, shoulder and torso harness 1100 for the diaper-changing platform system 2000 is further described below with respect to FIGS. 32-34. The shoulder and torso harness 1100 includes a right shoulder strap 1110a connected to a carrier torso strap 1120 that is removably attachable to and detachable from the platform member 2010.

FIG. 9E is a side view of the diaper-changing platform system 2000 showing the partition member 2020 in a position projecting from the platform member 2010 prior to being fully engaged, i.e., positioned at extended distance d1 from the platform member surface 2012. The seating supporting section 2050 is shown remaining in the depression defined in the platform member surface 2012 by the lower platform member surface 2012".

FIG. 9F is a side view of the diaper-changing platform system 2000 showing the partition member 2020 in a position projecting from the platform member after being fully engaged, i.e., having been moved to minimum distance d2 from the platform member surface 2012.

The diaper-changing platform system 2000 may also be manufactured from the same type of materials as indicated above with respect to diaper-changing platform system 1000.

To maintain the partition member 1020 or 2020 in the 90° position shown in FIGS. 9B-9C and FIGS. 9E-9F, respectively, various quick release connectors known in the art may be applied such as manufactured for child car seats or strollers such as for the UPPAbaby® (Rockland, Mass., USA) Mesa Car Seat or the Mamas & Papas Armadillo Bumper Bar Stroller Accessory (Mamas & Papas (Retail) Ltd. Great Britain) or other suitable similar connector.

An embodiment of a connector according to the present disclosure is described in FIGS. 10-14B which follow.

Figure 10:
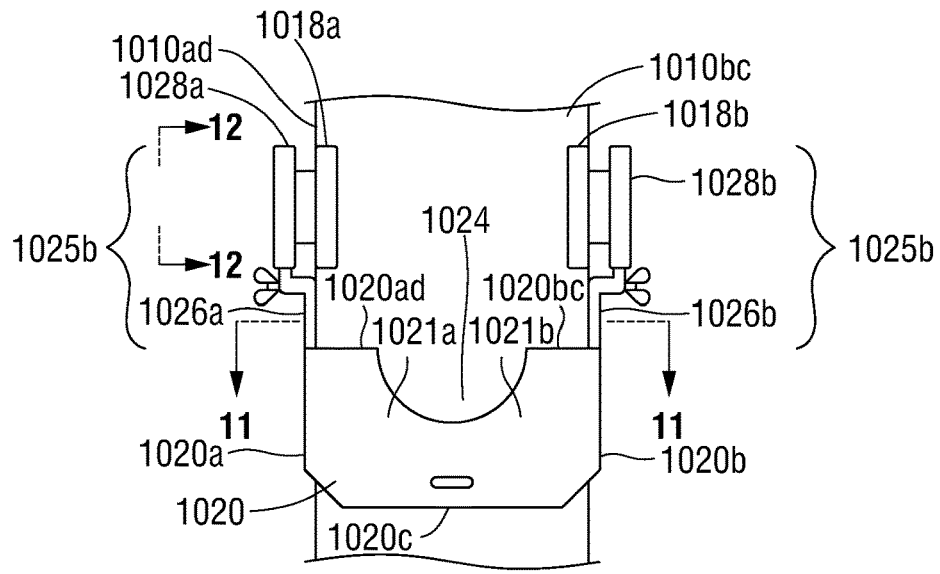
FIG. 10 is a view of the diaper-changing platform system showing the partition member in an unlocked but engaged position with respect to the platform member according to embodiments of the present disclosure.
Figure 11:
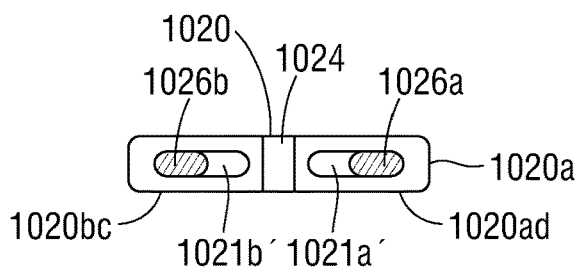
FIG. 11 illustrates a view of the platform member according to Section line 11-11 in FIG. 10 illustrated arm members of the partition member in an unlocked position.

FIG. 10 is a view of the diaper-changing platform system 1000 (or 2000) showing the partition member 1020 in an unlocked but engaged position with respect to the platform member 1010 according to embodiments of the present disclosure. Right position interlocking engaging member 1018a is rigidly positioned on edge 1010ad of platform member 1010 to engage with right position interlocking receptacle member 1028a that is rigidly connected to right arm member 1026a of partition member 1020. Correspondingly, left position interlocking engaging member 1018b is rigidly positioned on edge 1010bc of platform member 1010 to engage with left position interlocking receptacle member 1028b that is rigidly connected to left arm member 1026b of partition member 1020.

It should be noted that although the remaining details of the present disclosure are described generally with respect to diaper-changing platform system 1000, those skilled in the art having the benefit of the present disclosure will recognize that the remaining details of the present disclosure may be applied to diaper-changing platform system 2000 or other obvious embodiments of diaper-changing platform system 1000 or diaper-changing platform system 2000.

Figure 13A:
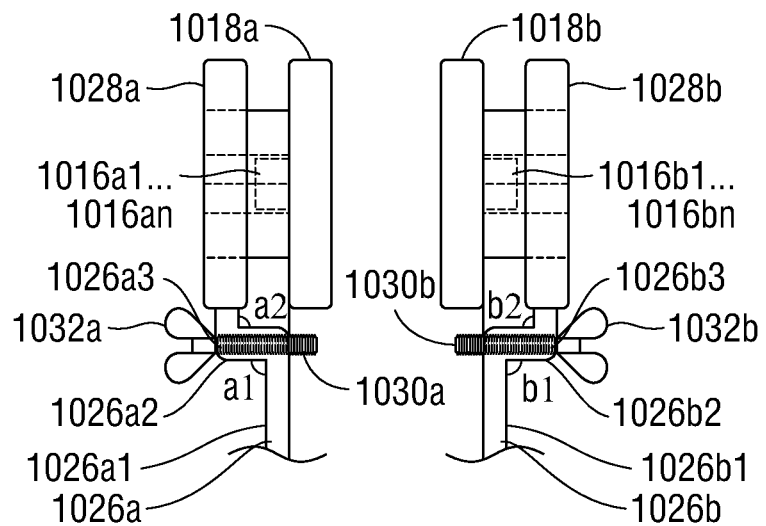
FIG. 13A is a side view of the angular position locking mechanism of FIG. 12 wherein female spur gears are in a disengaged or unlocked position and showing wing nuts that are utilized to lock the female spur gears to the male spur gears.
Figure 13B:
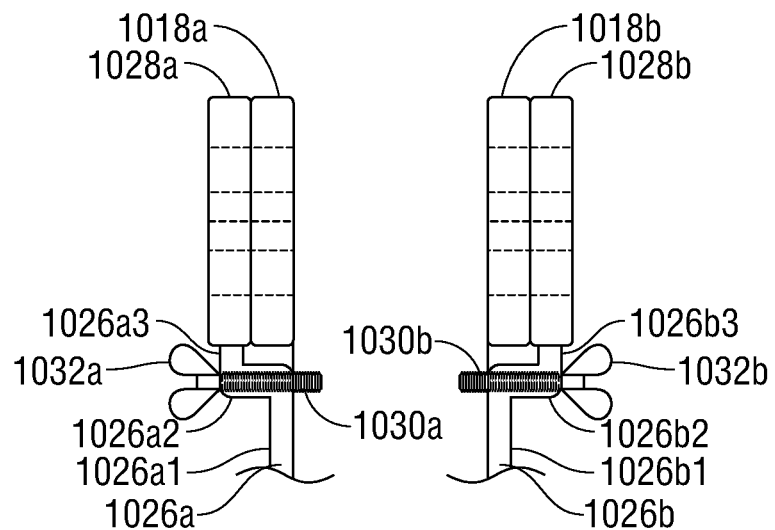
FIG. 13B is a side view of the angular position locking mechanism of FIG. 13A wherein the female spur gears are in an engaged or locked position and showing the wing nuts that are utilized to lock the female spur gears to the male spur gears.

Right arm member 1026a and left arm member 1026b are configured as mirror images of one another and are best illustrated in detail in FIGS. 13A and 13B. Right arm member 1026a is configured in the form of a partition member interface segment 1026a1 that is connected at an angle a1 with a right position interlocking receptacle member adjustment segment 1026a2 that includes a right position interlocking receptacle member adjustment mechanism in the form of a threaded rod 1030a and a threaded rod adjuster means 1032a, e.g., a wing nut. The right arm member 1026a further includes a right position interlocking receptacle member connector segment 1026a3 that is connected at an angle a2 to the right position interlocking receptacle member adjustment segment 1026a2 and to the right position interlocking receptacle member 1028a.

Similarly, but in a mirror-image configuration with respect to right arm member 1026a, left arm member 1026b is configured in the form of a partition member interface segment 1026b1 that is connected at an angle b1 with a left position interlocking receptacle member adjustment segment 1026b2 that includes a left position interlocking receptacle member adjustment mechanism in the form of a threaded rod 1030b and a threaded rod adjuster means 1032b, e.g., a wing nut. The left arm member 1026b further includes a left position interlocking receptacle member connector segment 1026b3 that is connected at an angle b2 to the left position interlocking receptacle member adjustment segment 1026b2 and to the left position interlocking receptacle member 1028b.

Other adjustment mechanisms functionally equivalent to the threaded rods 1030a or 1030b as and wing nuts 1032a or 1032b as position interlocking receptacle member adjustment mechanisms may be employed as are known in the art.

FIG. 11A illustrates a view of the platform member 1010 according to Section 11A-11A in FIG. 10 and illustrating arm members 1026a and 1026b of the partition member 1020 in an unlocked position. More particularly, as previously noted, partition member 1020 is generally configured as an arc or an arch forming a center space 1024 that enables positioning the partition member 1020 around an infant or toddler positioned on the platform member 1010. Thus, partition member right and left edge surfaces 1020ad and 1020bd, respectively, are adjacent to the arc or arch center space 1024 and are in proximity to platform member front surface 1012. The partition member 1020 defines a right arc or arch base portion 1021a and a left arc or arch base portion 1021b wherein the partition member right edge surface 1020ad coincides with the proximal edge of the right arc or arch base portion 1021a and wherein the partition member left edge surface 1020bc coincides with the proximal edge of the left arc or arch base portion 1021b.

The right arm member 1026a of the partition member 1020 is received in a channel 1021a' defined in the right arc or arch base portion 1021a extending distally from partition member right edge surface 1020ad. Similarly, left arm member 1026b of the partition member 1020 is received in a channel 1021b' defined in the left arc or arch base portion 1021b extending distally from partition member left edge surface 1020bc.

In FIG. 11A, the right arm member 1026a is illustrated in the unlocked position wherein the right arm member 1026a is shifted within the channel 1021a' closest towards right edge 1020a of the platform member 1020. Similarly, left arm member 1026b is illustrated in the unlocked position wherein the left arm member 1026b is shifted within the channel 1021b' closest towards left edge 1020b of the platform member 1020.

Figure 12:
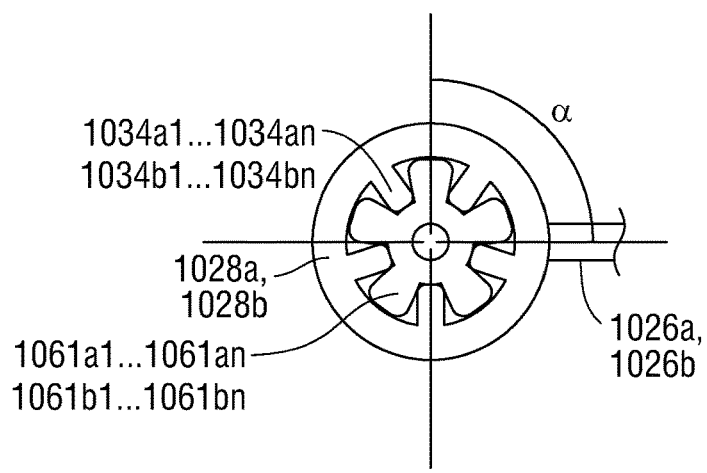
FIG. 12 illustrates a view according to Section Line 12 in FIG. 10 showing an angular position locking mechanism according to embodiments of the present disclosure to attach the partition member to the platform member at a desired angle.

FIG. 12 illustrates a view according to Section 12 in FIG. 10 showing either right position interlocking receptacle member 1028a or left position interlocking receptacle member 1028b as female spur gears having gear teeth 1034a1 . . . 1034an and 1034b1 . . . 1034bn, respectively, that define apertures therebetween.

Figure 14:
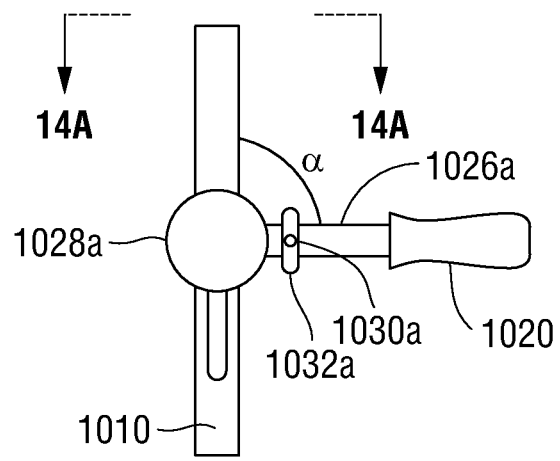
FIG. 14 is a side view of one side of the platform member showing the locking mechanism and the partition member at a 90° angle with respect to the platform member.
Figure 14A:
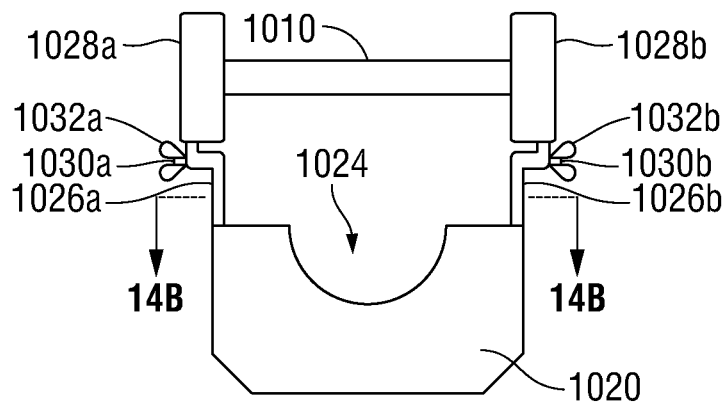
FIG. 14A is a plan view of the partition member and the platform member in a locked position as taken along Section line 14A-14A in FIG. 14.
Figure 14B:
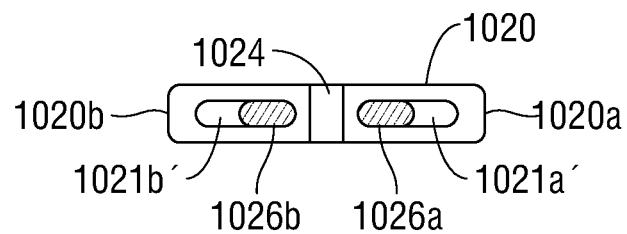
FIG. 14B illustrates a view of the platform member according to Section line 14A-14A in FIG. 14 illustrating arm members of the partition member in a locked position.

FIG. 12 also illustrates either right position interlocking engaging member 1018a or left position interlocking engaging member 1018*b* as male spur gears having gear teeth 1016*a*1 . . . 1016*an* and 1016*b*1 . . . 1016*bn*, respectively, that are received within the apertures defined between the female spur gear teeth 1034*a*1 . . . 1034*an* and 1034*b*1 . . . 1034*bn*, respectively as the right arm member 1026*a* and the left arm member 1026*b* are moved along the respective right position interlocking receptacle member adjustment mechanism rod 1030*a* via operation of the threaded rod adjuster means 1032*a* and the left position interlocking receptacle member adjustment mechanism rod 1030*b* via operation of the threaded rod adjuster means 1032*b*, as shown in FIG. 13B, towards the center space 1024, as illustrated in FIG. 14B.

Thereby, the female spur gears 1028*a* and 1028*b* interfacing with the respective male spur gears 1018*a* and 1018*b* to attach the partition member to the platform member at a desired angle α in FIG. 12, which is generally 90° with respect to right and left arm members 1026*a* and 1026*b*, respectively, as shown in FIGS. 12 and 14, although other angles from 0°-180° can also be effected.

The right arm member 1026*a* or left arm member 1026*b*, the right position interlocking receptacle member 1028*a* or left position interlocking receptacle member 1028*b*, the adjustment to the threaded rods 1030*a* or 1030*b* as and wing nuts 1032*a* or 1032*b* as position interlocking receptacle member adjustment mechanisms or their functional equivalents, and the right position interlocking engaging member 1018*a* or left position interlocking engaging member 1018*b* define either a right partition member angular position locking mechanism 1025*a* or a left partition member angular position locking mechanism 1025*b*, respectively.

FIG. 14 therefore is a side view of the right side of the platform member 1010 showing the right position interlocking receptacle member 1028*a* that has interlocked with the right position interlocking engaging member 1018*a* to hold the partition member 1020 at a 90° angle α with respect to the platform member 1010.

FIG. 14A is a plan view of the partition member 1020 and the platform member 1010 in the locked position as taken along Section 14A-14A in FIG. 14.

As described above, FIG. 14B is a view taken along Section 14B-14B in FIG. 14 illustrating operation of the threaded rod adjuster means 1032*b* towards the locked position, as shown in FIG. 13B, towards the center space 1024.

Figure 15:
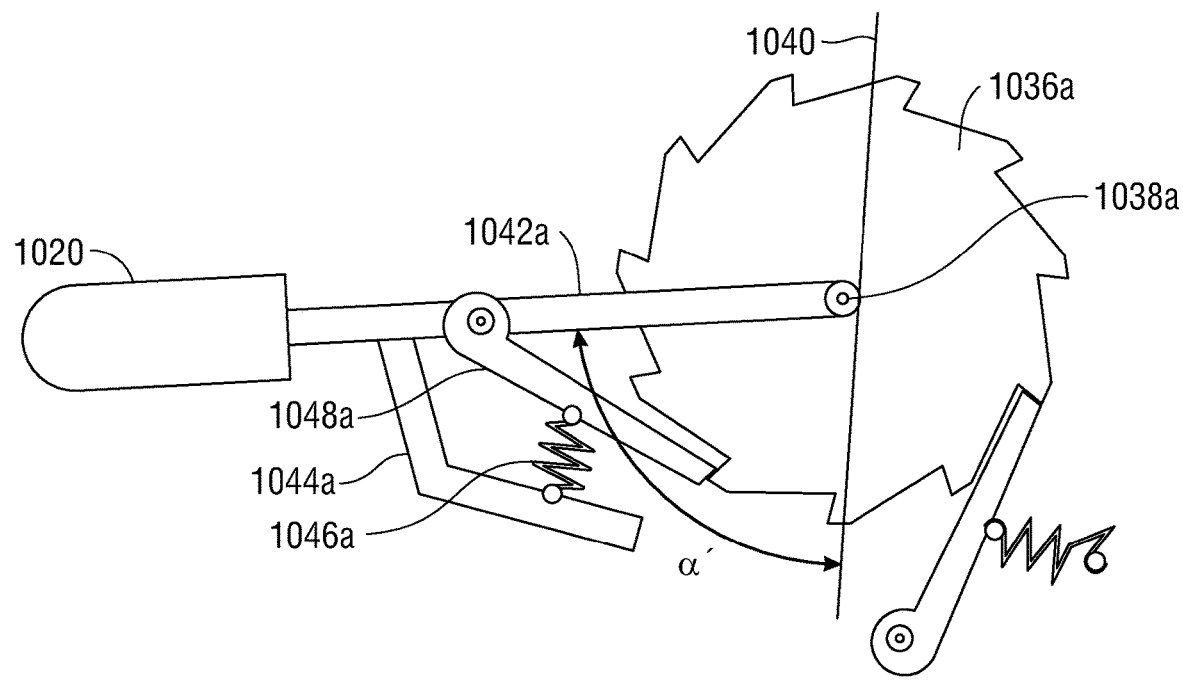
FIG. 15 is a side view of another embodiment of an angular position locking mechanism wherein a spring loaded adjustable ratchet and pawl mechanism is utilized to attach the partition member to the platform member at a desired angle.

FIG. 15 is a side view of another angular position locking mechanism 1040 that may function and be applied as another embodiment of a locking mechanism according to the present disclosure wherein a conventional spring loaded adjustable ratchet and pawl mechanism 1040 is utilized to attach the partition member 1020 to the platform member 1010 at a desired angle. A left arm member 1042*a* now extends from the partition member 1020 in a similar manner as explained above with respect to arm members 1026*a* and 1026*b*. However, the adjustable ratchet and pawl mechanism 1040 includes an auxiliary arm member 1044*a* that is movable to drive a spring member 1046*a* that enables engagement or disengagement of pawl 1048*a* from a desired tooth position on ratchet 1036*a*. The ratchet 1036*a* is now rigidly mounted on the edge 1010*ad* of platform member 1010 (not shown). The angle α' of the arm member 1042*a* and partition member 1020 with respect to the ratchet 1036*a* and platform member 1010 can be adjusted by rotation around centerline 1038*a* of the ratchet 1036*a*. The right side components are similarly constructed and are not further described or illustrated herein.

Figure 16:
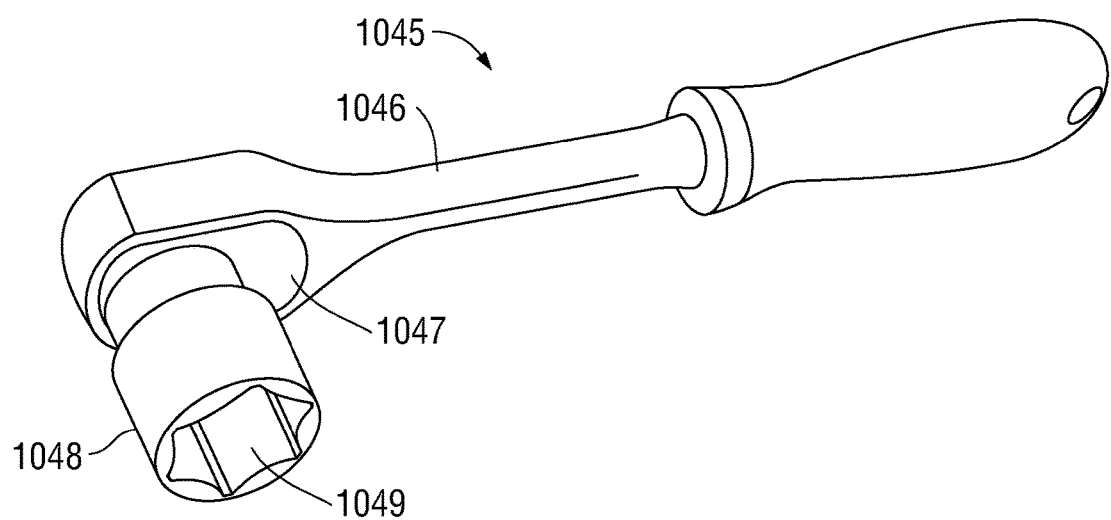
FIG. 16 is a perspective view of yet another angular position locking mechanism that may function and be applied as another embodiment of a partition member angular position locking mechanism according to the present disclosure.

FIG. 16 is a perspective view of yet another angular position locking mechanism 1045 that may function and be applied as another embodiment of a partition member angular position locking mechanism according to the present disclosure wherein a conventional ratchet wrench 1046 engages a socket 1048 to enable adjusting the angle α or α' between the platform member 1010 and partition member 1020 and rigidly locking the resulting position between the platform member 1010 and partition member 1020. The ratchet wrench 1046 includes an aperture 1047 that is positionable over socket end 1048. The socket 1048 is rigidly mounted to the platform member 1010 in a similar manner as either right position interlocking engaging member 1018*a* or left position interlocking engaging member 1018*b* shown in FIG. 4*ff* above. The ratchet wrench 1046 is movable towards and away from the socket end 1048 and the edges 1010*ad* or 1010*bc* of the platform member 1010 to enable the socket end 1048 to be received in the aperture 1047 while the partition member 1020 is at the desired angle with respect to the platform member 1010. The socket end 1048 further defines therein an aperture 1049 to receive and engage with an interlocking engaging member (not shown) similar to either right position interlocking engaging member 1018*a* or left position interlocking engaging member 1018*b*.

FIG. 17A is a side view of the diaper-changing platform system 1000 of FIGS. 9A-9C showing seating supporting section 1050 in a position parallel to the platform member 1010 and partition member 1020 is projecting away from the platform member surface 1012.

FIG. 17B is a side view of the diaper-changing platform system 1000 showing first or seating interlocking sub-section 1052 of the seating supporting section 1050 in a position projecting at an angle β1 from the platform member 1010 while second or limb rest interlocking sub-section 1054 and third or foot rest interlocking sub-section 1056 of the seating supporting section 1050 are projecting at an angle β2 of 90° from the first or seating interlocking sub-section 1052 projecting from the platform member 1010. The seating supporting section 1050 is now projecting entirely away from the platform member surface 1012.

FIG. 17C is a side view of the diaper-changing platform system 1000 showing third or foot rest interlocking sub-section 1056 of the seating supporting section 1050 now in a position projecting from the platform member surface 1012 in a direction parallel to the direction at which the seating section 1052 in FIG. 9B projects from the platform member 1010 to enable seating of an infant or toddler thereon. The third or foot rest section projects at an angle β3 formed between the second or limb rest interlocking sub-section 1054. As described below with respect to FIG. 18, in a similar manner as described above with respect to the partition member 1020 in FIGS. 10-14B, the fold out first or seat interlocking sub-section 1052 can be rigidly locked in place to support a child such as an infant or toddler sitting on it.

FIG. 17D is a side view of the diaper-changing platform system 2000 showing seating supporting section 2050 in a position parallel to the platform member 2010 and partition member 1020 is projecting away from the platform member surface 2012. As described above with respect to FIG. 9D, lower platform member surface 2012" defines a depression in the platform member surface 2012 which receives seating supporting section 2050. The depression defined by lower platform member surface 2012" extends generally from the right position interlocking engaging member 2018*a* and from the left position interlocking engaging member 2018*b* and towards lower edge 2010*cd* of platform member 2010 that extends between rounded corners 2010*c* and 2010*d*.

FIG. 17E is a side view of the diaper-changing platform system 1000 showing a first or seating interlocking subsection 2052 of the seating supporting section 2050 in a position projecting at an angle β1 from the platform member 2010 while a second or limb rest interlocking sub-section 2054 and a third or foot rest interlocking sub-section 2056 of the seating supporting section 2050 are projecting at an angle β2 of 90° from the first or seating interlocking sub-section 2052 projecting from the platform member 2010. The supporting member 2050 is now projecting entirely out of the depression defined in the platform member surface 2012 by the lower platform member surface 2012".

FIG. 17F is a side view of the diaper-changing platform system 2000 showing third or foot rest interlocking sub-section 2056 of the seating supporting section 2050 now in a position projecting from the platform member in a direction parallel to the direction at which the seating interlocking sub-section 2052 in FIG. 9E projects from the platform member 2010 to enable seating of an infant or toddler thereon. The third or foot rest interlocking sub-section projects at an angle β3 formed between the second or limb rest interlocking sub-section 2054. As described below with respect to FIG. 18, in a similar manner as described above with respect to the partition member 1020 in FIGS. 10-14B, the fold out first or seat interlocking sub-section 2052 can be rigidly locked in place to support a child such as an infant or toddler sitting on it.

To maintain the seating supporting section 1050 or 2050 in the various configurations shown in FIGS. 17A-17C and 17D-17F, respectively, in a similar manner as with respect to the partition members 1020 and 2020 as described above with respect to FIGS. 9B-9C and FIGS. 9E-9F, respectively, various quick release connectors known in the art may be applied such as manufactured for child car seats or strollers such as for the UPPAbaby® (Rockland, Mass., USA) Mesa Car Seat or the Mamas & Papas Armadillo Bumper Bar Stroller Accessory (Mamas & Papas (Retail) Ltd. Great Britain) or other suitable similar connector.

Figure 18:
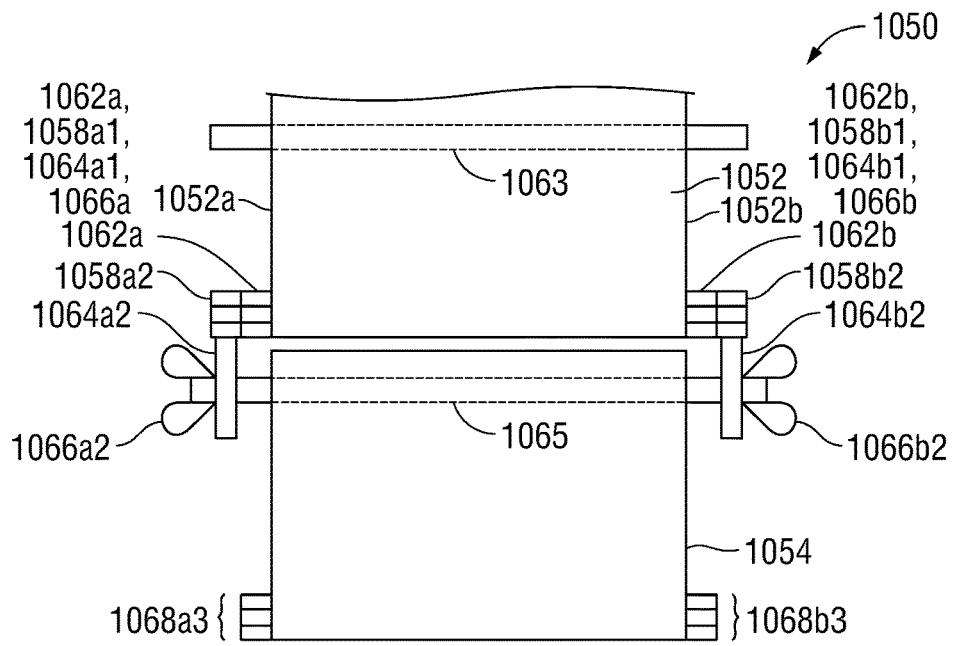
FIG. 18 is a frontal view of the diaper-changing platform system of FIG. 17B illustrating interconnections between the female spur gears and arm members to the male spur gears of the interlocking sections of the platform member angular position locking mechanisms in an unlocked position.
Figure 19:
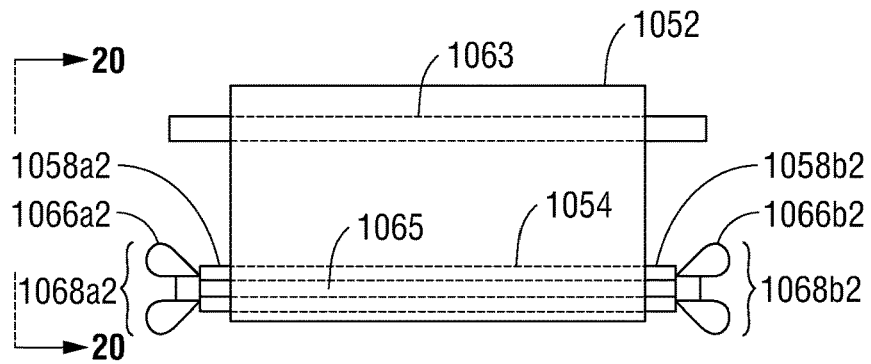
FIG. 19 is a plan view of the diaper-changing platform system of FIG. 17B illustrating interconnections between the female spur gears and arm members to the male spur gears of the interlocking sections of the platform member angular position locking mechanisms in a locked position.
Figure 20:
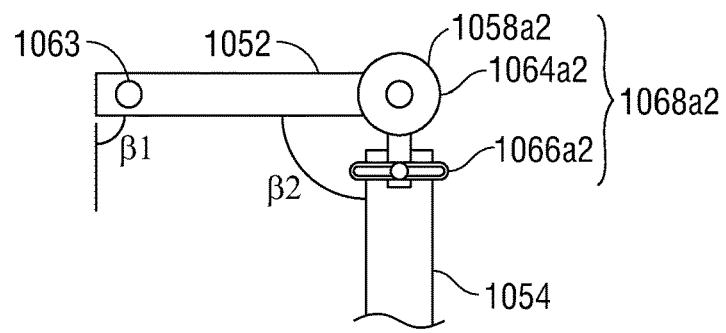
FIG. 20 is a side elevation view of the interconnections between the female spur gears and arm members to the male spur gears of an interlocking section of the platform member angular position locking mechanism in the locked position taken along section 20-20 of FIG. 19.

An embodiment of a connector according to the present disclosure is described in FIGS. 18-20 which follow.

FIG. 18 is a frontal view of the diaper-changing platform system 1000 of FIG. 17B illustrating interconnections between the first or seat interlocking sub-section 1052 of the seating supporting section 1050 in the position projecting at an angle β1 from the platform member 1010 while second or limb rest interlocking sub-section 1054 and third or foot rest interlocking sub-section 1056 of the seating supporting section 1050 are projecting at an angle β2 of 90° from the first or seating interlocking sub-section 1052 projecting from the platform member 1050. In a generally similar manner as with respect to the right and left arm members 1026*a* and 1026*b* and the right and left position interlocking receptacle members 1028*a* and 1028*b*, respectively, right and left position interlocking receptacle members 1058*a*1 and 1058*b*1 are rigidly connected to right arm member 1064*a* and to left arm member 1064*b*1 of first or seating interlocking sub-section 1052, respectively.

Platform member 1010 now includes right position interlocking engaging member 1062*a* that is rigidly positioned on edge 1010*ad* of platform member 1010 to engage with right position interlocking receptacle member 1058*a*1 that is rigidly connected to right arm member 1064*a*1 of first or seating interlocking sub-section 1052.

First or seating interlocking sub-section 1052 includes a right position interlocking receptacle member adjustment mechanism in the form of a threaded rod 1063 extending from right edge 1052*a* to left edge 1052*b* of the first or seating interlocking sub-section 1052 and a threaded rod adjuster means 1066*a*1, e.g., a wing nut similar to threaded rod adjuster means 1030*a*.

Right position interlocking engaging member 1062*a* and the right position interlocking receptacle member 1058*a*1 are configured in, and operate in, a similar manner as right position interlocking engaging member 1028*a* and the right position interlocking receptacle member 1018*a* as described above with respect to FIG. 12, wherein rotation of now threaded rod adjuster means 1066*a*1 releases or locks the first or seating interlocking sub-section 1052 to the platform member 1010 at the desired angle β1.

In a similar manner, platform member 1010 also includes left position interlocking engaging member 1062*b* that is rigidly positioned on edge 1010*bc* of platform member 1010 to engage with left position interlocking receptacle member 1058*b*1 that is rigidly connected to left arm member 1064*b*1 of first or seating interlocking sub-section 1052.

First or seating interlocking sub-section 1052 includes also a left position threaded rod adjuster means 1066*b*1, e.g., a wing nut similar to threaded rod adjuster means 1030*b*, Again, the left position interlocking engaging member 1062*b* and the left position interlocking receptacle member 1058*b*1 are configured in, and operate in, a similar manner as left position interlocking engaging member 1028*b* and the left position interlocking receptacle member 1018*b* as described above with respect to FIG. 6, wherein rotation of now threaded rod adjuster means 1066*b*1 also releases or locks the first or seating interlocking sub-section 1052 to the platform member 1010 at the desired angle β1.

The threaded rod 1063 may alternatively be replaced by two independent rods (not shown), one positioned on right edge 1052*a* and the other positioned on left edge 1052*b*.

In a similar manner as with respect to locking mechanisms 1025*a* and 1025*b* as described above with respect to FIG. 6, the right position interlocking engaging member 1062*a*, the right position interlocking receptacle member 1058*a*1, the right arm member 1064*a*1, the threaded rod adjuster means 1066*a*1 and threaded rod 1063 are configured to be functionally similar to right locking mechanism 1025*a* and define a first right supporting member locking mechanism 1068*a*1.

Additionally, left position interlocking engaging member 1062*b*, the left position interlocking receptacle member 1058*b*1, the left arm member 1064*b*1, the threaded rod adjuster means 1066*b*1 and threaded rod 1063 are configured to be functionally similar to left locking mechanism 1025*b* and define a first left supporting member locking mechanism 1068*b*1.

FIG. 18 further illustrates the interface between first or seating interlocking sub-section 1052 and second or limb rest interlocking sub-section 1054. The desired angle β2 between the first or seating interlocking sub-section 1052 and second or limb rest interlocking sub-section 1054 is adjusted and locked into position via right supporting member locking mechanism 1068*a*2 and left supporting member locking mechanism 1068*b*2 that are connected to now threaded rod 1065 that extends across the second or limb rest interlocking sub-section 1054.

FIG. 18 also illustrates a portion of right supporting member locking mechanism 1068*a*3 and left supporting member locking mechanism 1068*b*3 that connect with third or foot rest interlocking sub-section 1056 to establish desired angle β3.

Since the configuration and operation of right supporting member locking mechanisms 1068a2 and 1068a3 and left supporting member locking mechanisms 1068b2 and 1068b3 are substantially identical to right supporting member locking mechanism 1068a1 and left supporting member locking mechanism 1068b1, they are not further described in detail.

FIG. 19 is a plan view of the diaper-changing platform system of FIG. 17B illustrating the first or seating support member 1052 when projecting at angle β1 from platform member 1010 and further illustrating right supporting member locking mechanism 1068a2, including threaded rod adjuster means 1066a2 and right position interlocking receptacle member 1058a2, and left supporting member locking mechanism 1068b2, including threaded rod adjuster means 1066b2 and left position interlocking receptacle member 1058b2, in locked positions.

FIG. 20 is a side elevation view of the rigid interconnection between the right arm member 1064a2 to right position interlocking receptacle member 1058a2 of right supporting member locking mechanism 1068a2 in the locked position taken along Section 20-20 of FIG. 19, thereby illustrating angles β1 and β2.

Figure 21:
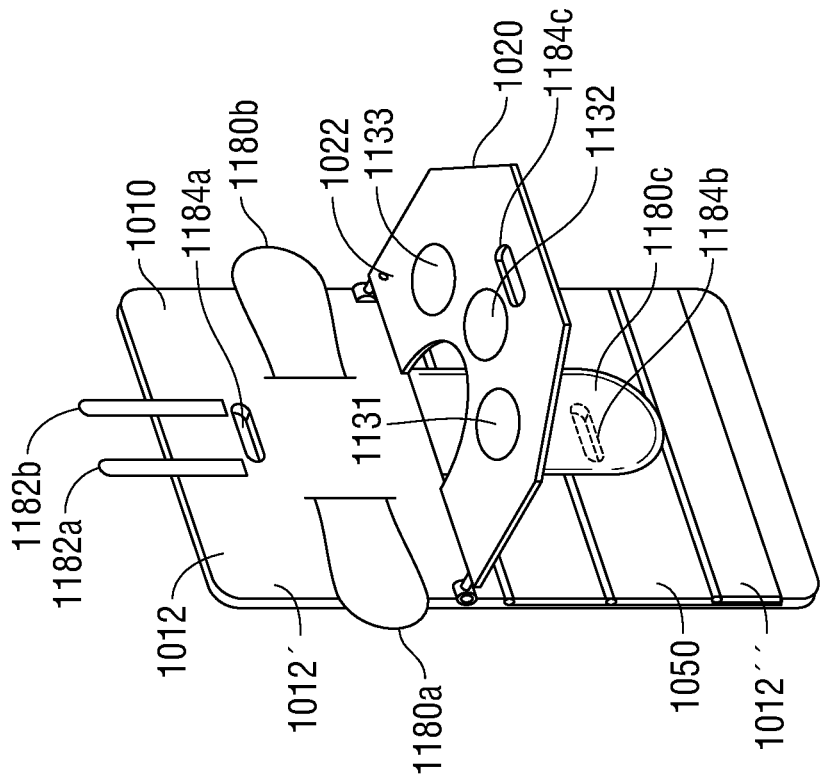
FIG. 21 is a perspective view of the diaper-changing platform system illustrating at least two infant or toddler torso support flaps configured to be removably attachable to the platform member and to engage with one another to restrain the torso of an infant or toddler while positioned on the platform member and at least two infant or toddler shoulder support flaps configured to be removably attachable to the platform member and to removably engage respectively with the infant or toddler torso support flaps to restrain the shoulders of an infant or toddler while positioned on the platform member and further illustrating one embodiment of a partition member according to the present disclosure.

FIG. 21 is a perspective view of the diaper-changing platform system 1000 illustrating at least two infant or toddler torso support flaps, e.g., right torso support flap 1180a and left torso support flap 1180b, that are configured to be removably attachable to the platform member 1010 and to engage with one another to restrain the torso of an infant or toddler while positioned on the platform member 1010. The diaper-changing platform system 1000 may also include at least two infant or toddler shoulder support flaps, e.g., right shoulder support flap 1182a and left shoulder support flap 1182b, that are also configured to be removably attachable to the platform member 1010 and to removably engage respectively with the infant or toddler torso support flaps 1180a and 1180b, respectively, to restrain the shoulders of an infant or toddler while positioned on the platform member.

At least one infant or toddler sanitary flap 1180c may be included that is removably attachable to the platform member 1010 and configured to overlap the supporting member 1050. The infant or toddler sanitary flap 1180c is thereby configured to accommodate soiling of the sanitary flap while an infant or toddler is seated on at least one interlocking section, e.g., first or seating interlocking sub-section 1052.

Figure 22:
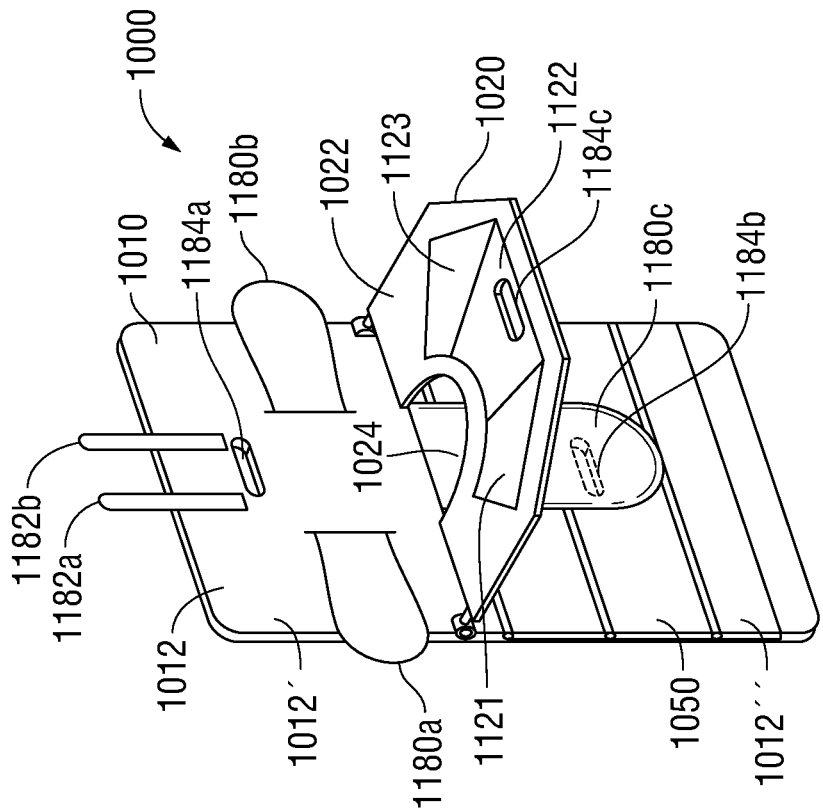
FIG. 22 is a perspective view of the diaper-changing platform system of FIG. 21 illustrating another embodiment of a partition member according to the present disclosure.

The diaper-changing platform system 1000 as illustrated in FIG. 21 further illustrates, according to the present disclosure, one embodiment of partition member 1020 in the extended position as represented by angle α in FIG. 12 or 14 wherein table surface 1022 includes thereon as part of an activity center a plurality of pictures or drawing surfaces or amusement objects or games or puzzles or the like 1121, 1122, 1123 that are arranged in an arc FIG. 22 is a perspective view of the diaper-changing platform system of FIG. 21 illustrating another embodiment of partition member 1020 according to the present disclosure wherein table surface 1022 includes thereon as part of an activity center a plurality of pictures or drawing surfaces or amusement objects or games or puzzles or the like 1131, 1132, 1133 represented as circles.

FIG. 23 is a frontal view of the diaper-changing platform system 1000 illustrating the movements of the torso support flaps 1180a and 1180b and the movement of the infant or toddler sanitary flap 1180c that is removably attachable to the platform member 1010 and that is configured to overlap the supporting member 1050. Torso support flap 1180a moves in the direction of arrow C while torso support flap 1180b moves in toward torso support flap 1180a in the direction of arrow D and sanitary flap 1180e moves vertically upward towards both torso support flap 1180a and torso support flap 1180b in the direction of arrow E so as to surround the lower portion of the torso of an infant or child. The torso support flaps 1180a and 1180b and shoulder support flaps 1182a and 1182b may be made from a flexible adhesive material such as Velcro® (Velcro, Inc., London, UK).

The platform member 1010 may include a fold-over strip 1011 generally positioned at the center of the platform member 1010.

FIG. 24 is a frontal view of the diaper-changing platform system 1000 illustrating the sanitary flap 1180c removed from the platform member 1010 and more particularly removed from a slit 1014 formed horizontally across the platform member 1010.

FIG. 25A is a side view of the diaper-changing platform system 1000 folded into a compact configuration via the fold-over strip 1011 generally positioned at the center of the platform member 1010.

FIG. 25B is an end view of the diaper-changing platform system 1000 of FIG. 25A folded into a compact configuration and showing the fold-over strip 1011.

Figure 26A:
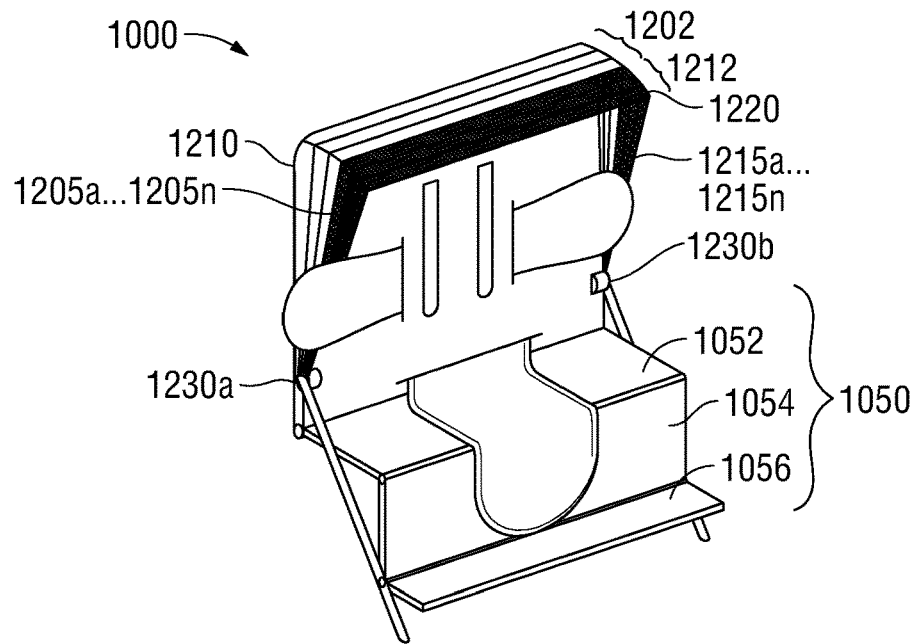
FIG. 26A is a perspective view of the diaper-changing platform system of FIG. 21 or 22 without the partition member and with the interlocking sections of the platform member projecting from the upper interlocking section of the platform member to enable an infant or toddler to sit on at least one interlocking section and further including a material removably attachable to a plurality of arch members defining a weather protection structure and another material removably attachable to a further plurality of arch members to define an insect protection structure, wherein the pluralities of arch members are only partially extended.

FIG. 26A is a perspective view of the diaper-changing platform system 1000 of FIG. 21 or 22 without the partition member 1020 and with the interlocking sub-sections 1052, 1054 and 1056 of the seating supporting section 1050 projecting from the platform member 1010 to enable an infant or toddler to sit on at least one interlocking section and further including a material 1210 removably attachable to a plurality of arch members 1205a . . . 1205n defining a weather protection structure 1202.

Another material 1220 is removably attachable to a further plurality of arch members 1215a . . . 1215n to define an insect protection structure 1212, wherein the pluralities of arch members 1205a . . . 1205n and 1215a . . . 1215n are only partially extended.

The plurality of arch members 1205a . . . 1205n and 1215a . . . 1215n are illustrated as an example in a rectangular configuration and are commonly and rotatably joined to the platform member 1010 at right arch member joint connection 1230a and at left arch member joint connection 1230b. The plurality of arch members 1205a . . . 1205n and 1215a . . . 1215n may be made from a durable plastic or a metallic material.

Figure 26B:
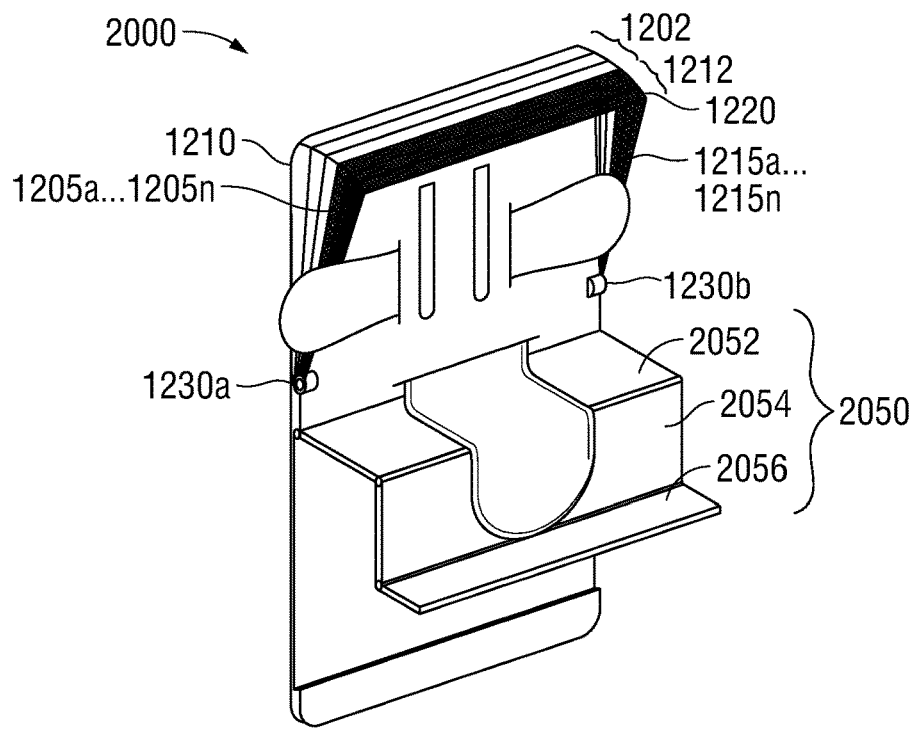
FIG. 26B is a perspective view of the alternate embodiment of the diaper-changing platform of FIGS. 21-22 and FIG. 26A that is illustrated in FIGS. 9D-9F and 17D-17F.

Similarly, FIG. 26B is a perspective view of the diaper-changing platform system 2000 of FIG. 9D-9F or 17D-17F without the partition member 2020 and with the interlocking sub-sections 1052, 1054 and 1056 of the seating supporting section 2050 projecting from the platform member 2010 to enable an infant or toddler to sit on at least one interlocking section and further including a material 2210 removably attachable to a plurality of arch members 2205a . . . 2205n defining a weather protection structure 2202.

Another material 2220 is removably attachable to a further plurality of arch members 2215a . . . 2215n to define an insect protection structure 2212, wherein the pluralities of arch members 2205a . . . 2205n and 2215a . . . 2215n are only partially extended.

The plurality of arch members 2205a . . . 2205n and 2215a . . . 2215n are illustrated as an example in a rectangular configuration and are commonly and rotatably joined to the platform member 2010 at right arch member joint connection 2230a and at left arch member joint connection 2230b. The plurality of arch members 2205a ... 2205n and 2215a ... 2215n may be made from a durable plastic or a metallic material.

Figure 27A:
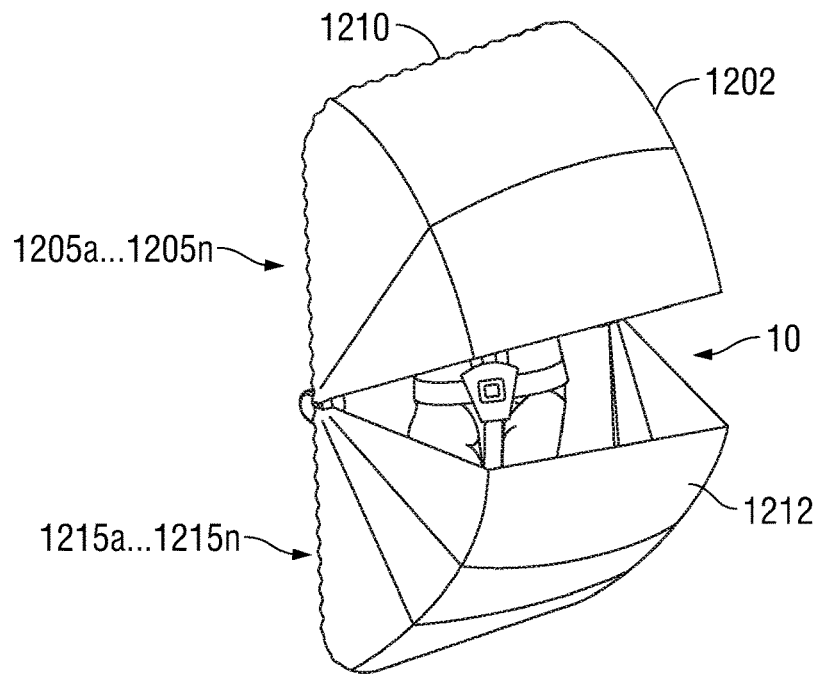
FIG. 27A illustrates a perspective view of the diaper-changing platform system illustrating a partial view of an infant or toddler positioned vertically and strapped to the platform member and further illustrating the weather protection and insect protection structures almost entirely positioned over the infant or toddler.
Figure 27B:
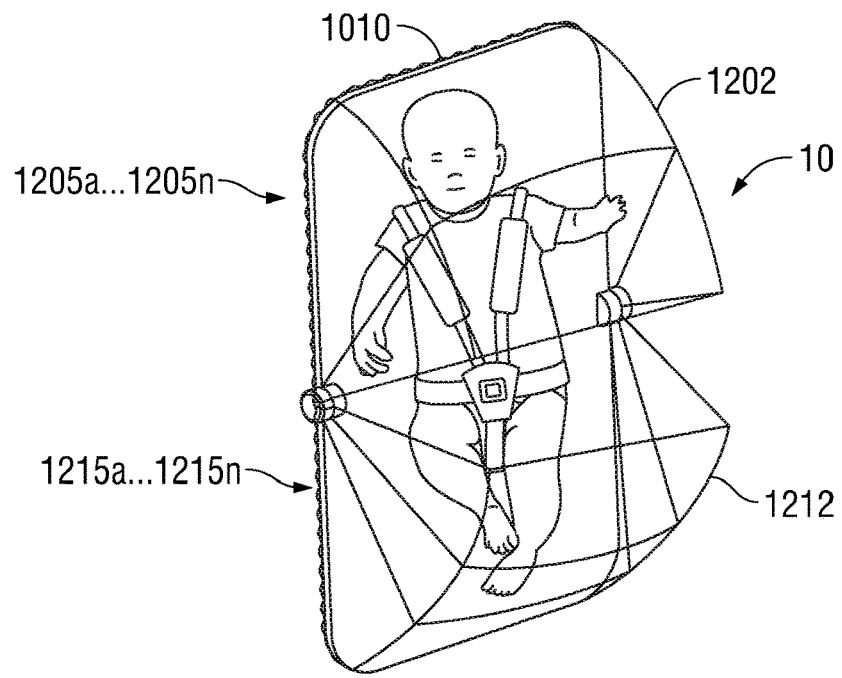
FIG. 27B illustrates another perspective view of the diaper-changing platform system of FIG. 27A illustrating of full view of an infant or toddler positioned vertically and strapped to the platform member and further illustrating the weather protection and insect protection structures almost entirely positioned over the infant or toddler.

FIGS. 27A-27B illustrate perspective views of the diaper-changing platform system 1000 illustrating an infant or toddler 10 positioned vertically and strapped to the platform member 1010 and further illustrating the weather protection and insect protection structures 1202 and 1212, respectively almost entirely positioned over the infant or toddler 10.

Figure 27C:
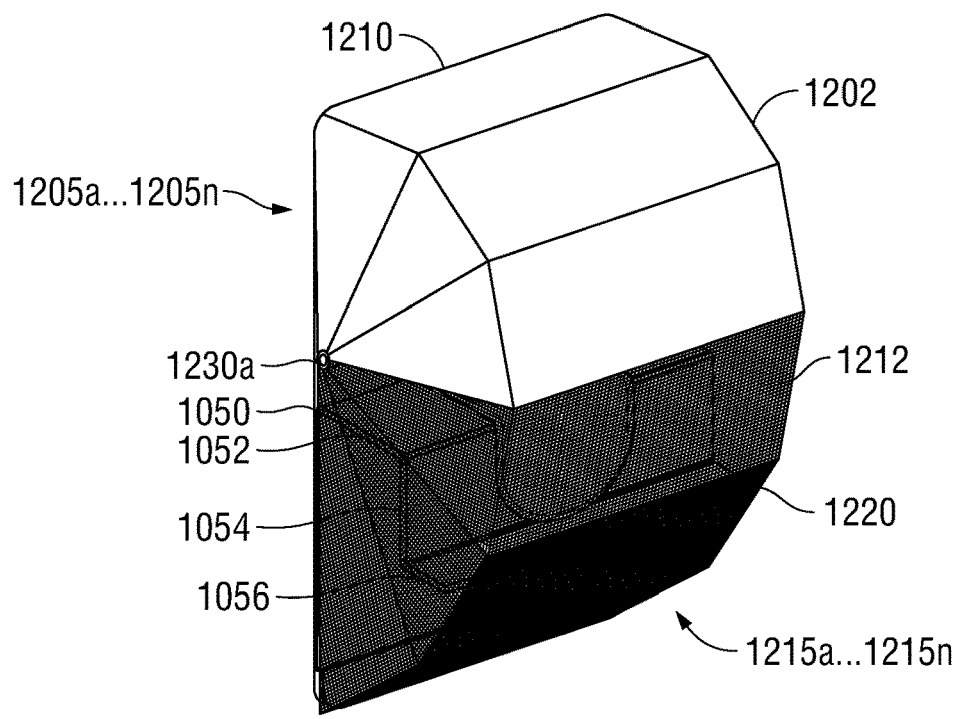
FIG. 27C is a perspective view of the diaper-changing platform system of FIG. 26 wherein the pluralities of arch members are fully extended over the platform member.

FIG. 27C is a perspective view of the diaper-changing platform system 1000 of FIG. 20 wherein the pluralities of arch members 1205a ... 1205n and 1215a ... 1215n are fully extended over the platform member to fully extend the weather protection structure 1202 and the insect protection structure 1212.

Figure 27D:
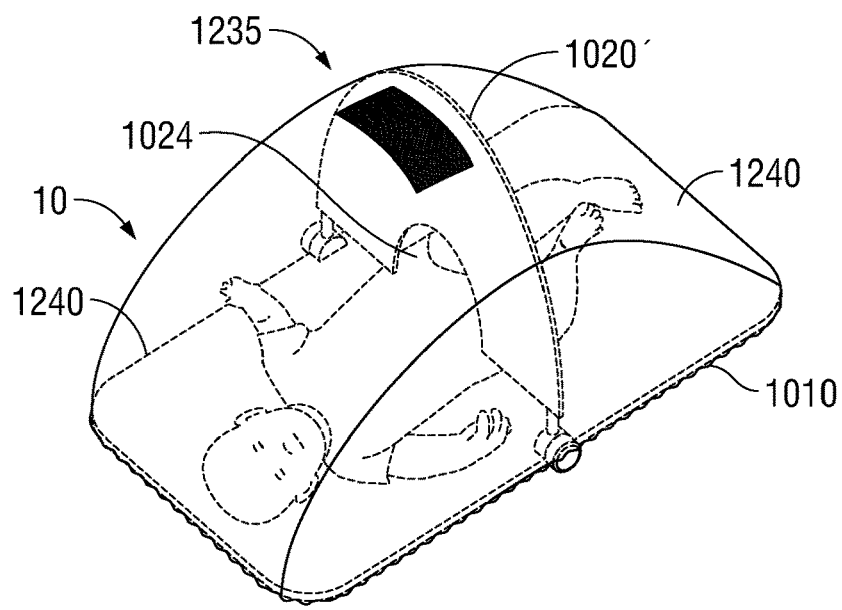
FIG. 27D illustrates a perspective view of the diaper-changing platform system illustrating a partition member attached to the platform member and extending over an infant or toddler positioned horizontally on the platform member and further illustrating a material supported by the partition member and defining an insect protection structure extending over the infant or toddler positioned on the platform member.

FIG. 27D illustrates a perspective view of the diaper-changing platform system 1000 illustrating an arc-shaped partition member 1020' attached to the platform member and extending over an infant or toddler 10 positioned horizontally on the platform member 1010 and further illustrating a mesh material 1240 supported by the partition member and defining an insect protection structure 1235 extending over the infant or toddler 10 positioned on the platform member 1010. To enable the insect protection structure 1235 to be removable from the platform member 1010 by manually grasping, insect protection structure 1235 only rests on the arc-shaped partition member 1020', although the insect protection structure 1235 may also be removably attached to the arc-shaped partition member 1020' if desired.

Figure 28:
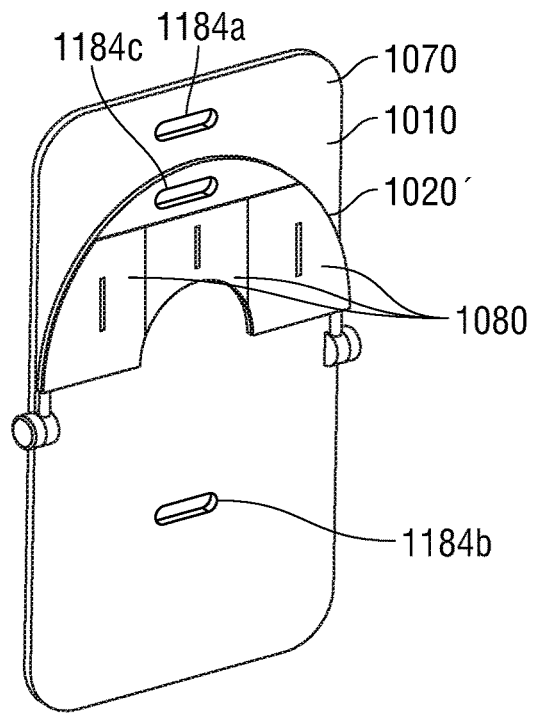
FIG. 28 illustrates another aspect of the partition member positioned parallel to the platform member and including a plurality of pockets for storage of objects therein.

FIG. 28 illustrates another aspect of the partition member 1020 as a partition member 1020' in the form of a concentric circular arc shape that is positioned parallel to the platform member 1010 on the upper interlocking section 1070. The partition member 1020' defines a lower surface 1022' beneath the table surface 1022. The lower surface 1022' includes a plurality of pockets 1080 for storage of objects such as toys or games or diaper changing and cleaning supplies or the like therein. The pockets 1080 may be sealed by a zipper or Velcro®, etc.

Figure 29:
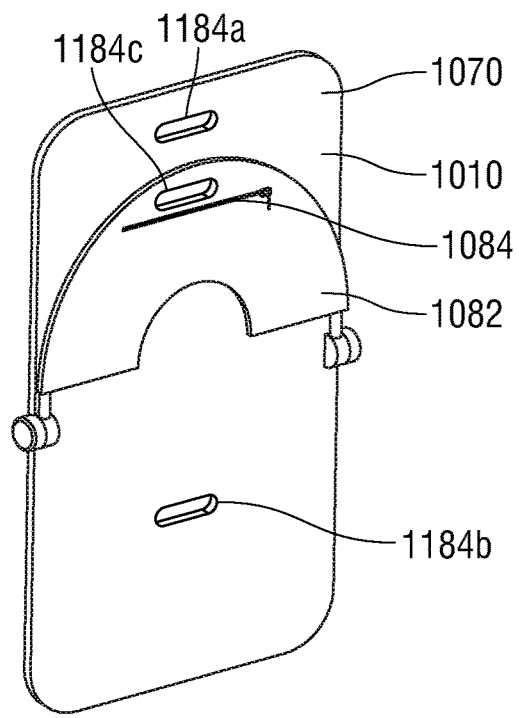
FIG. 29 illustrates still another aspect of the partition member positioned parallel to the platform member and including a single pocket for storage of objects therein.

FIG. 29 illustrates still another aspect of the partition member 1020' of FIG. 28 positioned parallel to the platform member 1010 and including a single pocket 1082 sealed by a zipper or Velcro®, etc. 1084 for storage of objects such as toys or games or diaper changing and cleaning supplies or the like therein.

FIG. 30 illustrates a carrier 20 of the diaper-changing platform system 1000 or 2000 wherein the carrier 20 is facing forward and supporting the diaper-changing platform system 1000 or 2000 on the carrier's front via at least two shoulder straps, e.g., right shoulder strap 1110a and left shoulder strap 1110b as illustrated in FIGS. 9A-9F and 17A-17F that are supported by the carrier 20 and attached to the diaper-changing platform system 1000 or 2000. The diaper-changing platform system 1000 or 2000 is in the flat position without an infant or toddler being supported.

FIG. 31 illustrates the carrier of the diaper-changing platform system 1000 or 2000 of FIG. 30 wherein the carrier 20 is again facing forward and further illustrating an infant or toddler 10 seated on the seating supporting section 1050 of the diaper changing platform system 1000 or 2000. The infant or toddler 10 is now secured to the platform system 1000 or 2000 via the torso support flaps 1180a and 1180b and shoulder straps 1182a and 1182b.

FIG. 32 illustrates a rear view of the carrier of the diaper-changing platform system of FIGS. 30 and 31 and further illustrating the shoulder and torso harness 1100 of FIGS. 9A-9F and 17A-17F configured around the carrier 20 to support the diaper-changing platform system 1000 or 2000 for an infant or toddler to be seated on the seating supporting section 1050 of the diaper changing platform system 1000 or 2000. In addition to the right shoulder strap 1110a and left shoulder strap 1110b and carrier torso strap 1120 that is removably attachable to and detachable from the platform member 1010, as illustrated in FIGS. 9A-9F and 17A-17F, the shoulder and torso harness 1100 may further include an additional strap 1115 between the right shoulder strap 1110a and left shoulder strap 1110b. In FIG. 32, the straps 1115 and 1120 illustrate buckles (not numbered) shown on the back of the carrier 20. For convenience of the carrier 20, a front buckle (not shown) may be located on the front of the carrier on carrier torso strap 1120 and/or on shoulder straps 1110a and 1110b.

Figure 34:
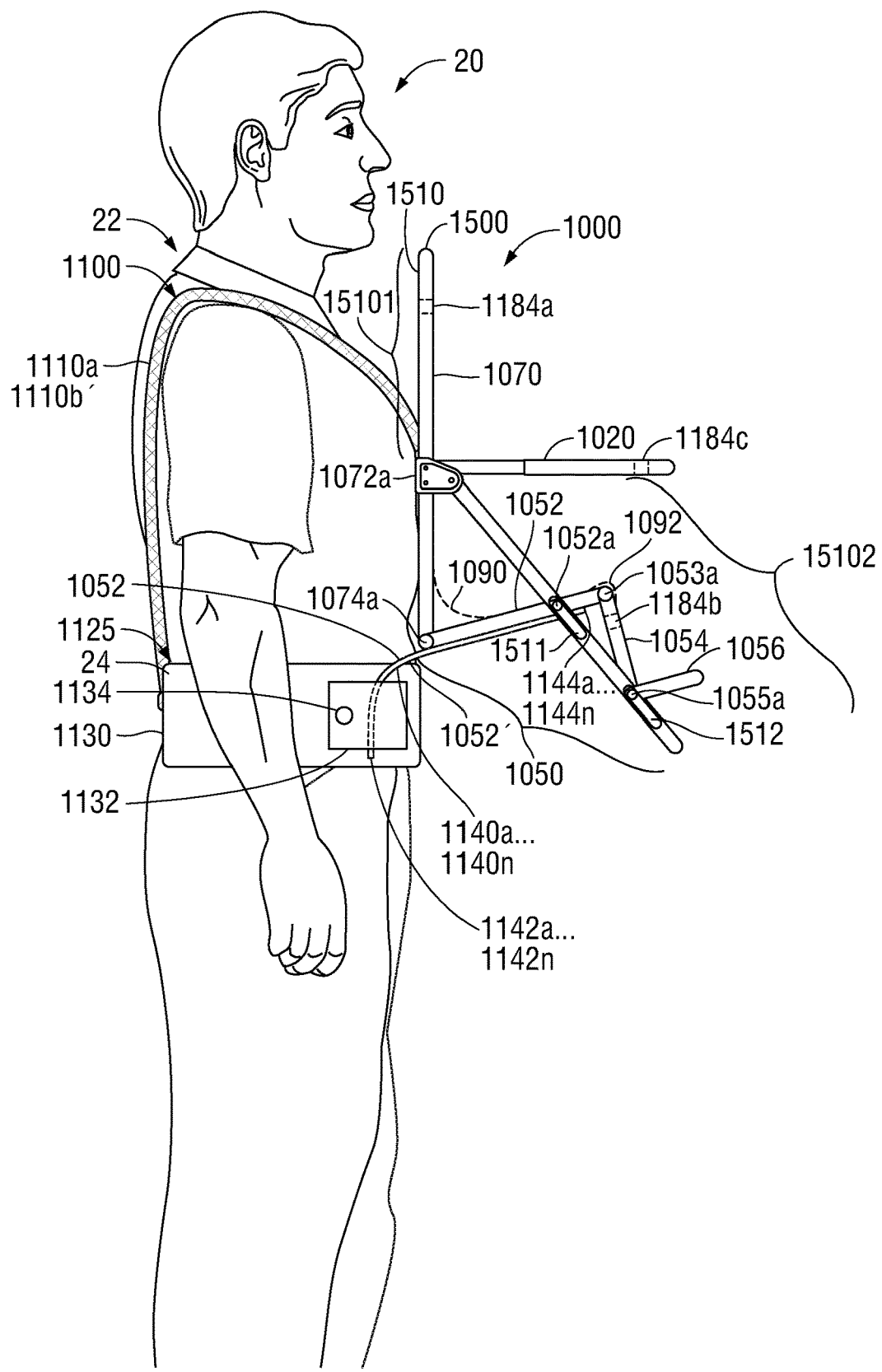
FIG. 34 illustrates the shoulder and torso harness of FIGS. 30-32 wherein supporting ribs supported by a waist band around the carrier are engaged and configured to provide adjustable weight support for the diaper-changing platform system when in the seating position to reduce the weight of the infant or toddler applied to the shoulders of the carrier and transfer such weight to the waist band and mid-section of the carrier.

FIG. 33 illustrates another aspect of the diaper-changing platform system 1000 or 2000 wherein the diaper-changing platform system 1000 or 2000 now includes a partially rectangular and partially arc-shaped partition member 1020" in the raised position and wherein the platform 1010 or 2010 of diaper-changing platform system 1000 or 2000, respectively, is positioned in the flat position on furniture 30. FIG. 34 illustrates the shoulder and torso harness 1100 of FIGS. 30-32 wherein a waist-band weight supporting system 1125 includes supporting structures such as supporting ribs 1140a ... n supported by a waist band 1130 worn around or surrounding the carrier 20 are engaged in one or more pockets 1132 formed in the waist band 1130 on the front torso of the carrier 20 and which are secured by securing device 1134 such as snaps. First ends 1142a ... 1142n of the supporting ribs 1140a ... 1140n are passed through or supported in the one or more pockets 1132 while second ends 1144a ... 1144n of the supporting ribs 1140a ... 1140n interface with lower surface 1052' of the interlocking sub-section 1052 that can be positioned to enable an infant or toddler to sit on the interlocking sub-section 1052 by being positioned to project from the upper interlocking section 1070 of platform member 1010.

The supporting ribs 1140a ... 1140n are configured to provide adjustable weight support for the diaper-changing platform system 1000 when in the seating position to reduce the weight of the infant or toddler applied to the shoulders 22 of the carrier 20 and transfer such weight to the waist band 1120 and waist or mid-section 24 of the carrier 20.

Figure 35:
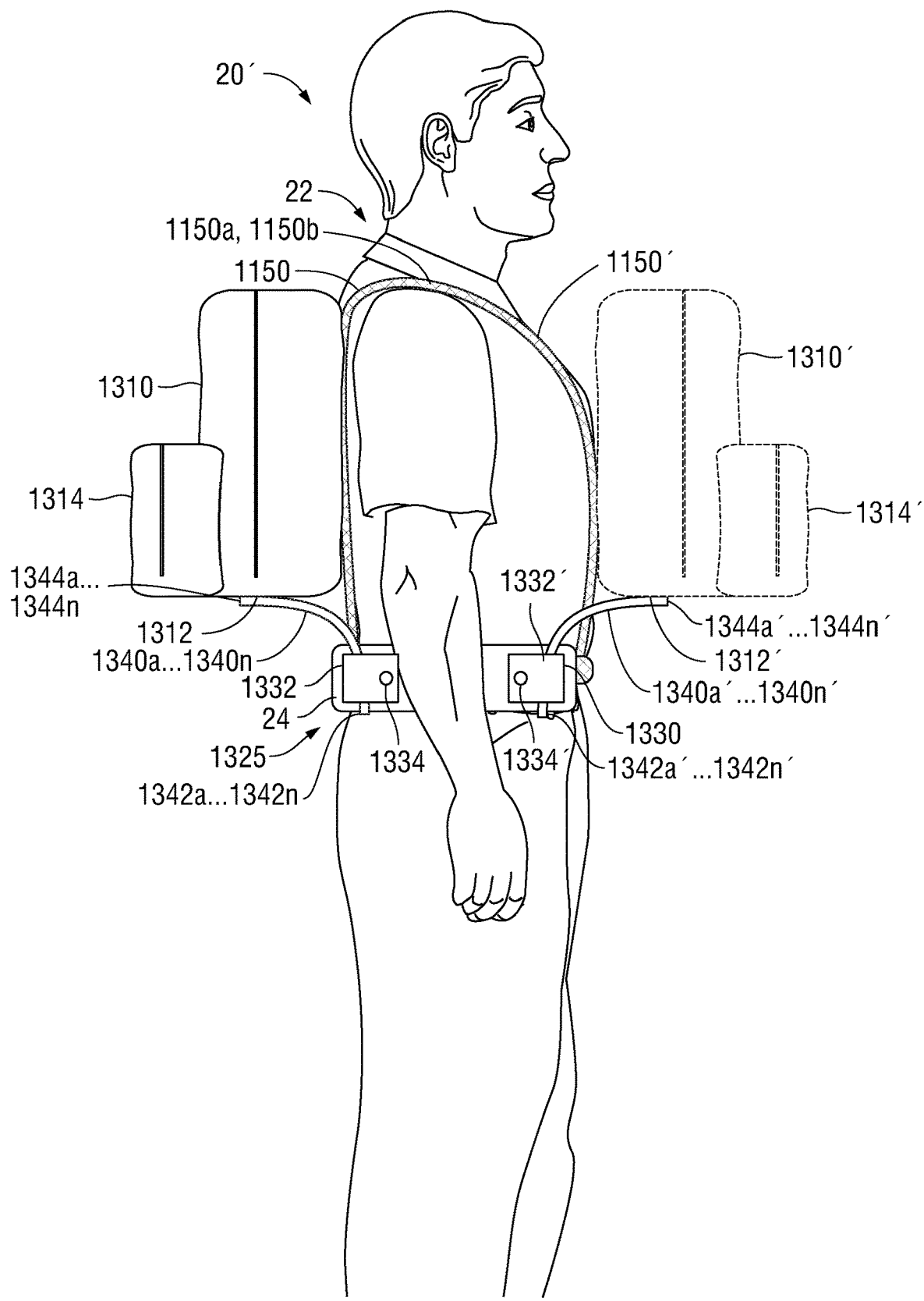
FIG. 35 illustrates a waist-band support system under a back-pack or front-pack such as would be carried by hikers, military personnel, etc., to transfer the weight to the waist band and mid-section of the carrier.

FIG. 35 illustrates a waist-band weight supporting system 1325 under a back-pack 1310 (or front-pack 1310') such as would be carried by hikers, military personnel, etc. Waist-band weight supporting system 1325 includes supporting structures such as supporting ribs 1340a ... 1340n supported by a waist band 1330 worn around or surrounding carrier 20' that are engaged in one or more pockets 1332 formed in the waist band 1330 and which are secured by securing device 1334 that may include snaps. In contrast to waist-band weight supporting system 1125 of FIG. 34, to support back-pack 1310 (and optional water bottle and carrier compartment 1314 or the like), the pockets 1332 are positioned on the rear torso of the carrier 20'.

In a similar manner as with respect to waist-band weight supporting system 1125, first ends 1342a ... 1342n of the supporting ribs 1340a ... 1340n are passed through or supported in the one or more pockets 1332 while second ends 1344a ... 1344n of the supporting ribs 1340a ... 1340n interface with lower surface 1312 of back-pack 1310.

In the case of front-pack 1310' (and optional water bottle and carrier compartment 1314' or the like) shown in dashed lines, waist band weight supporting system 1325 includes supporting ribs 1340a' ... 1340n' supported by waist band 1330 around carrier 20' that are engaged in one or more pockets 1332' formed in the waist band 1330 and which are secured by securing device 1334' that may include snaps. In a similar manner as waist-band weight supporting system 1125 of FIG. 34, to support front-pack 1310', the pockets 1332 are positioned on the front torso of the carrier 20'.

First ends 1342a' . . . 1342n' of the supporting ribs 1340a' . . . 1340n' are passed through or supported in the one or more pockets 1332 while second ends 1344a' . . . 1344n' of the supporting ribs 1340a' . . . 1340n' interface with lower surface 1312' of front-pack 1310'.

In a similar manner, the waist-band weight supporting system 1325 transfers weight from the shoulders 22 to the waist band 1330 and waist or mid-section 24 of the carrier 20' where it is less burdensome to the carrier 20'.

Figure 36:
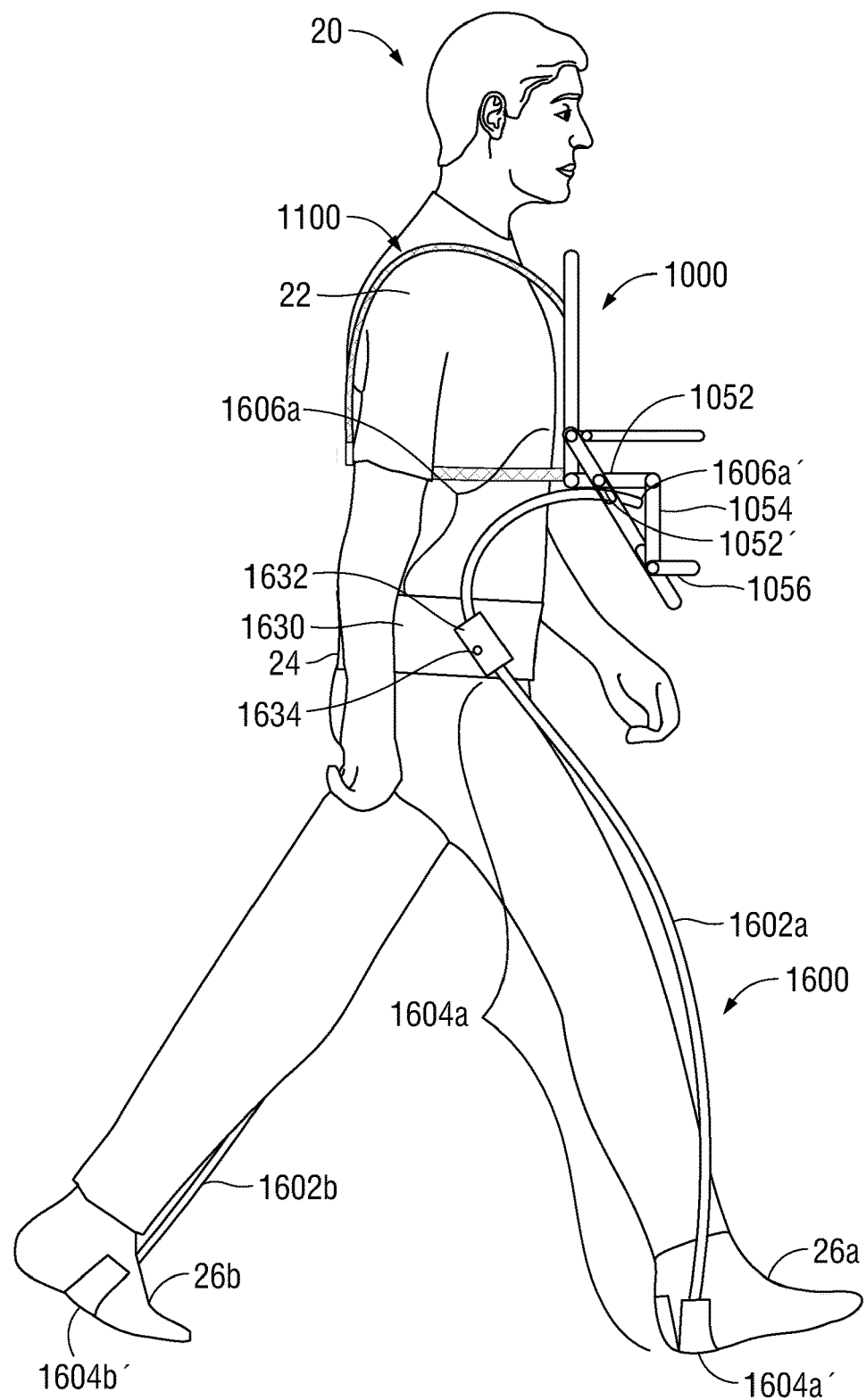
FIG. 36 illustrates a single piece curved contour "Exoskeleton" support system supporting the seat of the diaper-changing platform system.

FIG. 36 illustrates the shoulder and torso harness 1100 of FIGS. 30-32 including an exoskeleton weight supporting system 1600 that includes a waist band 1630 having a first lateral pocket 1632 with securing device 1634 such as a snap and which is mounted on carrier 20 who is carrying the diaper-changing platform system 1000 on the front of the torso. The shoulder and torso harness 1100 is mounted on shoulders 22 of carrier 20.

A first lateral exoskeleton supporting structure 1602a in the form of a contoured rod is mounted on the carrier 20 via waist band 1630 surrounding waist or mid-section 24 of the carrier 20. The first lateral exoskeleton supporting structure 1602a includes a first contoured portion 1604a having an end 1604a' that is mounted to right foot 26a of the carrier 20 and which bows outwardly away from the right leg of carrier 20 and passes through the first lateral pocket 1632 in the waist band 1630. A second portion 1606a of the first lateral exoskeleton supporting structure 1602a and bows in a direction towards the upper torso of the carrier 20 such that tip or end 1606a' of the second portion 1606a is disposed under the lower surface 1052' of the interlocking sub-section 1052 that is positioned to project from the upper interlocking section 1070 of platform member 1010.

A second lateral exoskeleton supporting structure 1602b analogous to the first lateral exoskeleton supporting structure 1602a is mounted on the left foot 26b of the carrier and is not otherwise shown in FIG. 36 or described as its configuration with respect to the waist band 1630 and the diaper-changing platform system 1000 is obvious to those skilled in the art in view of the present disclosure. Another aspect of the second lateral exoskeleton supporting structure 1602b is partially further illustrated in FIG. 36C and described below.

The exoskeleton weight supporting system 1600 is thus comprised of single piece curved contour "Exoskeleton" supporting structures 1602a and 1602b again for the purposes of supporting the interlocking sub-section 1052 that is positioned as a seat of the diaper-changing platform system 1000 to transfer weight from the shoulders 22 to the waist band 1630 and mid-section of the carrier 20, with the additional assistance of the feet 26a and 26b, such that the weight is less burdensome to the carrier 20.

Generally, the exoskeleton weight supporting system 1600 is mounted to or by the carrier 20 after mounting of the diaper-changing platform system 1000 to or by the carrier 20.

Figure 36A:
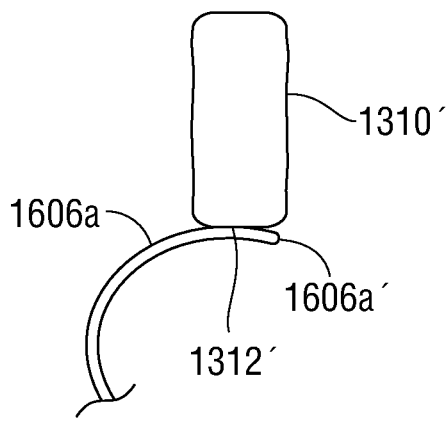
FIG. 36A shows a detail of the tip or end of the exoskeleton support system supporting a front pack that can be carried by a carrier.

FIG. 36A shows a detail of the tip or end 1606a' of the second portion 1606a that is disposed under the lower surface 1312' of front pack 1310' of FIG. 35 where carrier 20' is supporting front pack 1310'.

Figure 36B:
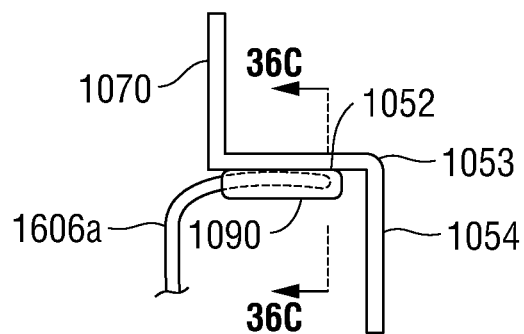
FIG. 36B illustrates a profile view of the exoskeleton support system of FIG. 36 that includes flat plate ends to support the diaper-changing platform system to stabilize the exoskeleton while supporting the diaper-changing platform system.
Figure 36C:
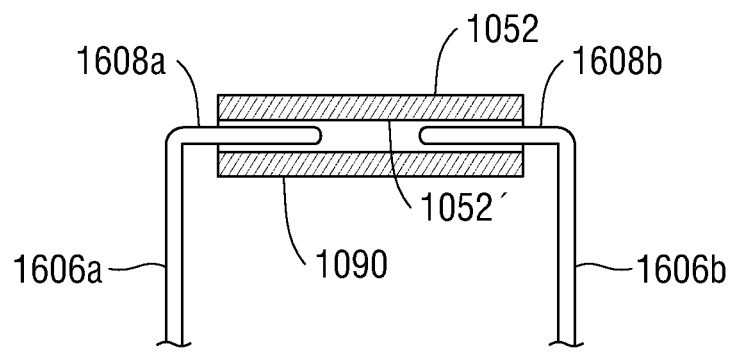
FIG. 36C illustrates a frontal view of the exoskeleton support system of FIG. 36A that includes flat plate ends to support the diaper-changing platform system.

FIGS. 36B and 36C. illustrate an aspect of the exoskeleton weight supporting system 1600 wherein, to stabilize the exoskeleton weight supporting system 1600 in supporting the interlocking sub-section 1052, a plate member 1608a is included to the second portion 1606a of the first lateral exoskeleton supporting structure 1602a at tip or end 1606a' such that the plate member 1608a is now disposed under the lower surface 1052' of the interlocking sub-section 1052, while plate member 1608b is included to second portion 1606b of the second lateral exoskeleton supporting structure 1602b at tip or end 1606b' such that the plate member 1608b is similarly disposed under the lower surface 1052' of the interlocking sub-section 1052.

The lower surface 1052' of the interlocking sub-section 1052 includes a pocket lining 1090 configured and disposed to receive the plate members 1608a and 1608b therein thereby stabilizing the exoskeleton weight supporting system 1600 to the diaper-changing platform system 1000 during motion by the carrier 20.

A similar configuration of a pocket lining (not illustrated) that receives plate members 1608a and 1608b may be applied to the lower surface 1312' of front pack 1310' shown in FIG. 36A.

The plate members 1608a and 1608b and pocket lining 1090 are generally formed in a flat configuration although in other aspects, the plate members 1608a and 1608b and pocket lining 1090 may be formed with one or more curved portions or multiple linear portions as desired and suitable for the application.

Figure 37A:
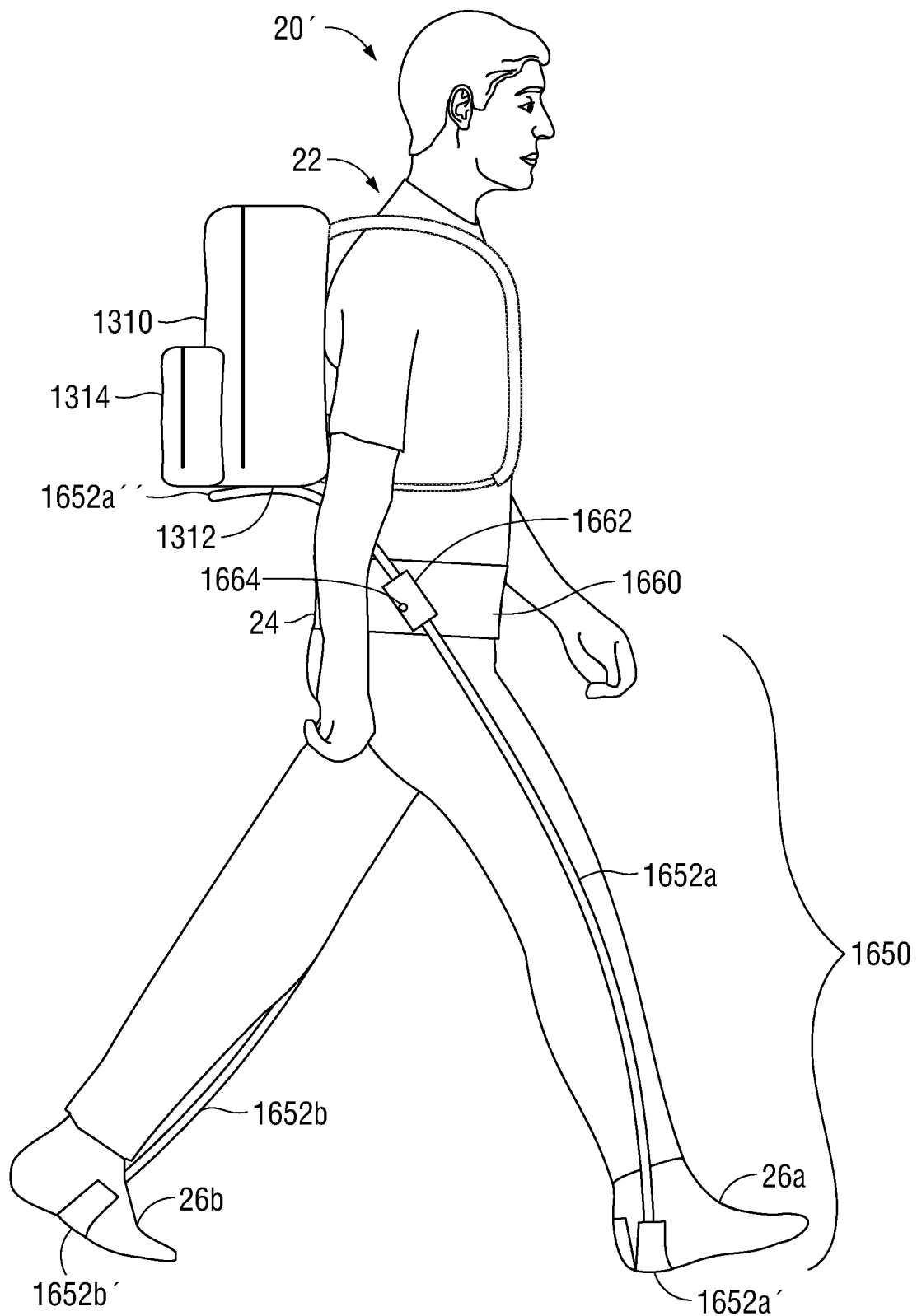
FIG. 37A illustrates one aspect of an exoskeleton system configured and disposed to support a back pack.

FIG. 37A illustrates another aspect of the present disclosure of an exoskeleton weight supporting system 1650 that is configured and disposed to support back pack 1310.

Exoskeleton weight supporting system 1650 includes first lateral exoskeleton supporting structure 1652a in the form of a contoured rod is mounted on the carrier 20' via waist band 1660 surrounding waist 24 of the carrier 20'. The first lateral exoskeleton supporting structure 1652a defines contoured configuration having an end 1652a' that is mounted to right foot 26a of the carrier 20' and which bows outwardly away from the right leg of carrier 20' and passes through the first lateral pocket 1662 in the waist band 1660 wherein second end 1652a" first lateral exoskeleton supporting structure 1652a extends outwardly away from the rear of the torso of carrier 20' so as to be disposed under the lower surface 1312 of back pack 1310. The first lateral exoskeleton supporting structure 1652a is secured to the pocket 1662 via securing device 1664 such as snaps.

A second lateral exoskeleton supporting structure 1652b analogous to the first lateral exoskeleton supporting structure 1652a is mounted on the left foot 26b of the carrier 20 and also is not otherwise shown in FIG. 37A or described as its configuration with respect to the waist band 1660 and the back pack 1310 is obvious to those skilled in the art in view of the present disclosure.

In a similar manner as with respect to exoskeleton weight supporting system 1600 described with respect to FIGS. 36B and 36C, those skilled in the art will recognize and understand that in a like manner as with respect to pocket lining 1090 that is configured and disposed to receive the flat plates 1608a and 1608b, a similar configuration of plate members 1608a and 1608b may be applied to the exoskeleton supporting system 1650 and a similar configuration of a pocket lining (not illustrated) that receives plate members 1608a and 1608b may be applied to the lower surface 1312 of front pack 1310 shown in FIG. 37A.

Again, exoskeleton weight supporting system 1650 is thus comprised of single piece curved contour "Exoskeleton" supporting structures 1652a and 1652b again for the purposes of supporting the back pack 1310 to transfer weight from the shoulders 22 to the waist band 1660 and midsection of the carrier 20, with the additional assistance of motion of the feet 26a and 26b, such that the weight is less burdensome to the carrier 20.

Figure 37B:
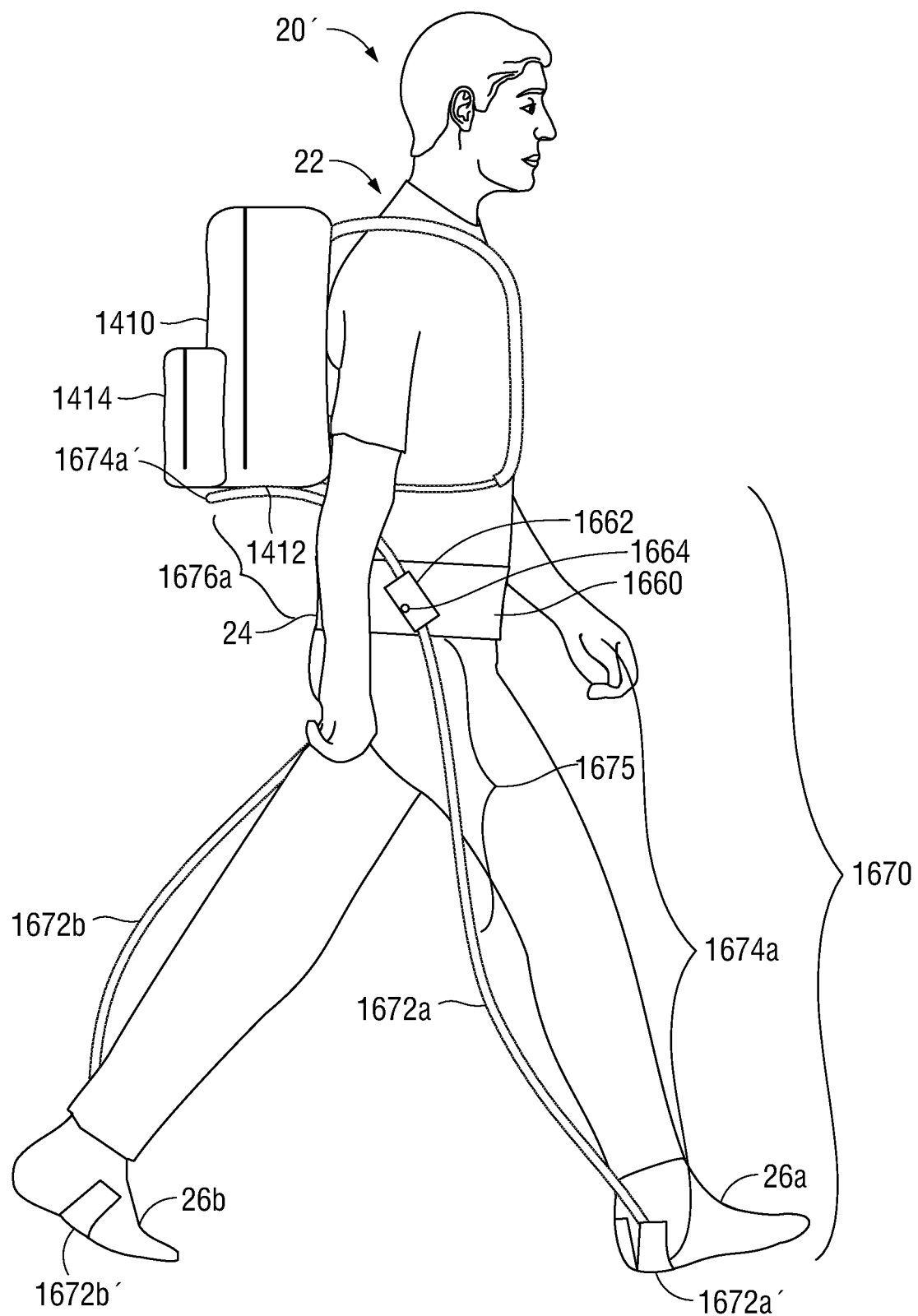
FIG. 37B illustrates another aspect of an exoskeleton system configured and disposed to support a back pack.

FIG. 37B illustrates another aspect of the present disclosure of an exoskeleton weight supporting system 1670 that is configured and disposed to support back pack 1410 (and optional water bottle and carrier compartment 1414 or the like) having a lower surface 1412.

A first lateral exoskeleton supporting structure 1672a in the form of a contoured rod is mounted on the carrier 20' via waist band 1660 surrounding waist 24 of the carrier 20'. The first lateral exoskeleton supporting structure 1672a includes a first contoured portion 1674a having an end 1674a' that is mounted to right foot 26a of the carrier 20' and which bows inwardly away from the right leg of carrier 20' towards the rear side of carrier 20' to form an inflection point or region 1675 with second portion 1676a of the first lateral exoskeleton supporting structure 1672a. From the inflection point or region 1675, the second portion 1676a bows in a direction towards the upper torso of the carrier 20' and passes through the first lateral pocket 1632 in the waist band 1630, wherein the first lateral exoskeleton supporting structure 1672a is secured in the first lateral pocket again via securing device 1664 such as snaps. The second portion 1676a of the first lateral exoskeleton supporting structure 1672a bows in the direction towards the upper torso of the carrier 20 such that tip or end 1676a' of the second portion 1606a is disposed under the lower surface 1412 of back pack 1410, which extends vertically downward a further distance along the rear side of the torso of the carrier 20' to the waist band 1660 as compared to the extent that back pack 1310 extends vertically downward along the rear side of the torso of the carrier 20' as illustrated in FIG. 37A.

A second lateral exoskeleton supporting structure 1672b analogous to the first lateral exoskeleton supporting structure 1672a is mounted on the left foot 26b of the carrier and is not otherwise shown in FIG. 37B or described as its configuration with respect to the waist band 1660 and the back pack 1410 is obvious to those skilled in the art in view of the present disclosure.

In a similar manner as with respect to exoskeleton supporting system 1600 described with respect to FIGS. 36B and 36C, those skilled in the art will recognize and understand that in a like manner as with respect to pocket lining 1090 that is configured and disposed to receive the plate members 1608a and 1608b, a similar configuration of plate members 1608a and 1608b may be applied to the exoskeleton supporting system 1670 and a similar configuration of a pocket lining (not illustrated) that receives plate members 1608a and 1608b may be applied to the lower surface 1412 of front pack 1410 shown in FIG. 37B.

The exoskeleton weight supporting system 1670 is thus comprised of single piece curved contour "Exoskeleton" supporting structures 1672a and 1672b again for the purposes of supporting lower surface 1412 of back pack 1410 to transfer weight from the shoulders 22 to the waist band 1660 and mid-section of the carrier 20', with the additional assistance of motion of the feet 26a and 26b, such that the weight is less burdensome to the carrier 20'.

The waist bands 1130 in FIG. 34, 1330 in FIG. 35, 1630 in FIG. 36, and 1660 in FIGS. 37A and 37B may be formed from materials such as, but not limited to, polyester, nylon and rubber blends that provide both flexibility and strength that are utilized for back support brace devices or similar applications such as fabric belts worn by military personnel, etc.

The supporting ribs 1140a . . . 1140n and 1340a . . . 1340n may be made from materials such as, but not limited to, carbon fiber that provide both flexibility and structural strength.

The exoskeleton structures 1602a, 1602b in FIGS. 36, 36A, 36B, 36C and 1652a, 1652b in FIG. 37A and 1672a, 1672b in FIG. 37B may similarly be made from materials such as, but not limited to, carbon fiber that provide both flexibility and structural strength.

While several embodiments and methodologies of the present disclosure have been described and shown in the drawings, it is not intended that the present disclosure be limited thereto, as it is intended that the present disclosure be as broad in scope as the art will allow and that the specification be read likewise.

Therefore, the above description should not be construed as limiting, but merely as exemplifications of particular embodiments and methodologies. Those skilled in the art will envision other modifications within the scope of the claims appended hereto.

What is claimed is:

1. A weight supporting system comprising:
a band configured to be worn around the waist of a carrier, the band including at least one securing device to secure at least one supporting structure, the band and the at least one supporting structure configured to provide support to and including at least one of:
a platform system configured such that a seating supporting section can be positioned to project from a platform member to enable an infant or toddler to sit on the seating supporting section when positioned to project from the platform member while being carried by the carrier of the platform system; or
a back pack worn on a rear torso of the carrier of the back pack; or
a front pack worn on a front torso of the carrier of the front pack,
wherein the weight supporting system is configured to reduce the weight applied to the shoulders of the carrier of an infant or toddler seated on the seating supporting section of the platform system, or to reduce the weight applied to the shoulders of the carrier of the back pack or to reduce the weight applied to the shoulders of the carrier of the front pack,
wherein the at least one supporting structure is configured in a curved configuration and having a first end positioned in proximity to the weight and substantially below the seating supporting section, the back pack or the front pack, and a second end operatively coupled to the securing device, a vertical reference line defined through the securing device, the at least one supporting structure disposed in a curvilinear manner from the first end to pass through the vertical reference line and continue to be operably coupled to the at least one securing device at the second end,
the weight of the platform system or the weight of the back pack or the weight of the front pack causing a vertical downward force and a first bending moment with respect to a distance between the first end and the at least one securing device,
the first bending moment occurring in a clockwise or a counterclockwise direction with respect to an axis perpendicularly traversing the first end,
the curved configuration of the at least one supporting structure passing through the vertical reference line causing a second bending moment in a counterclockwise or clockwise direction respectively with respect to the first bending moment that at least partially counteracts the first bending moment, thereby reducing to the carrier instability caused by the weight being carried by the carrier.

2. The weight supporting system according to claim 1, wherein the at least one supporting structure includes at least two supporting ribs that are supported by the band and configured to support the at least one of:
- a platform system configured such that a seating supporting section can be positioned to project from a platform member to enable an infant or toddler to sit on the seating supporting section when positioned to project from the platform member;
- a back pack worn on a rear torso of the carrier of the back pack; and
- a front pack worn on a front torso of the carrier of the front pack, or combinations thereof.

3. The weight supporting system according to claim 1,
wherein the at least one supporting structure includes at least two supporting ribs connected to the band configured to be worn around the waist of the carrier, the supporting ribs configured in a curved configuration,
wherein at or near an apex of the at least two supporting ribs a spring force is created, and a bending moment is created where the supporting ribs are connected to the band configured to be worn around the waist of the carrier, and
wherein a resulting vertical force to the at least two supporting ribs due to weight applied to the at least one supporting structure causes a first bending moment in a clockwise or counterclockwise direction where the at least two supporting ribs are connected to the band configured to be worn around the waist of the carrier and a resulting vertical force formed within the at least two supporting ribs causes a second bending moment in an opposite direction to the clockwise or counterclockwise direction of the first bending moment, respectively, thereby alleviating load carrying effects on the carrier.

4. A weight supporting system comprising:
a band configured to be worn around the waist of a carrier, the band including at least one securing device to secure at least one supporting structure, the band and the at least one supporting structure configured to provide support to a seating supporting section to enable an infant or toddler to sit on the seating supporting section while being carried by the carrier;
wherein the weight supporting system is configured to reduce the weight applied to the shoulders of the carrier of an infant or toddler seated on the seating supporting section,
wherein the at least one supporting structure is configured in a curved configuration and having a first end positioned in proximity to the weight and substantially below the seating supporting section, and a second end operatively coupled to the securing device, the at least one supporting structure disposed in a curvilinear manner from the first end and operably coupled to the at least one securing device at the second end,
the weight of the seating supporting section causing a vertical downward force and a first bending moment with respect to a distance between the first end and the at least one securing device,
the first bending moment occurring in a clockwise or a counterclockwise direction with respect to an axis perpendicularly traversing the first end,
the curved configuration of the at least one supporting structure causing a second bending moment in a counterclockwise or clockwise direction respectively with respect to the first bending moment that at least partially counteracts the first bending moment, thereby reducing to the carrier instability caused by the weight being carried by the carrier.

5. The weight supporting system according to claim 4, wherein the at least one supporting structure includes at least two supporting ribs that are supported by the band and configured to support the seating supporting section to enable an infant or toddler to sit on the seating supporting section.

6. The weight supporting system according to claim 4,
wherein the at least one supporting structure includes at least two supporting ribs connected to the band configured to be worn around the waist of the carrier, the supporting ribs configured in a curved configuration,
wherein at or near an apex of the at least two supporting ribs extends creating a spring force is created, by the supporting ribs and a bending moment is created where the supporting ribs are connected to the band configured to be worn around the waist of the carrier, and
wherein a resulting vertical force to the at least two supporting ribs due to weight applied to the at least one supporting structure causes a first bending moment in a clockwise or counterclockwise direction where the at least two supporting ribs are connected to the band configured to be worn around the waist of the carrier and a resulting vertical force formed within the at least two supporting ribs causes a second bending moment in an opposite direction to the clockwise or counterclockwise direction of the first bending moment, respectively, thereby alleviating load carrying effects on the carrier.

7. A weight supporting system comprising:
a band configured to be worn around the waist of a carrier, the band including at least one securing device to secure at least one supporting structure, the band and the at least one supporting structure configured to provide support to and including at least one of:
- a back pack worn on a rear torso of the carrier of the back pack; or
- a front pack worn on a front torso of the carrier of the front pack, wherein the weight supporting system is configured to reduce the weight applied to the shoulders of the carrier of the back pack or to reduce the weight applied to the shoulders of the carrier of the front pack,
wherein the at least one supporting structure is configured in a curved configuration and having a first end positioned in proximity to the weight and substantially below the back pack or the front pack, and a second end operatively coupled to the securing device, the at least one supporting structure disposed in a curvilinear manner from the first end to be operably coupled to the at least one securing device at the second end,
the weight of the back pack or the weight of the front pack causing a vertical downward force and a first bending moment with respect to a distance between the first end and the at least one securing device,
the first bending moment occurring in a clockwise or a counterclockwise direction with respect to an axis perpendicularly traversing the first end,
the curved configuration of the at least one supporting structure causing a second bending moment in a counterclockwise or clockwise direction respectively with respect to the first bending moment that at least partially counteracts the first bending moment, thereby reducing to the carrier instability caused by the weight being carried by the carrier.

8. The weight supporting system according to claim 7, wherein the at least one supporting structure includes at least two supporting ribs that are supported by the band and configured to support the at least one of:
   a back pack worn on a rear torso of the carrier of the back pack; and
   a front pack worn on a front torso of the carrier of the front pack,
or combinations thereof.

9. The weight supporting system according to claim 7,
   wherein the at least one supporting structure includes at least two supporting ribs connected to the band configured to be worn around the waist of the carrier, the supporting ribs configured in a curved configuration,
   wherein at or near an apex of the at least two supporting ribs a spring force is created, and a bending moment is created where the supporting ribs are connected to the band configured to be worn around the waist of the carrier, and
   wherein a resulting vertical force to the at least two supporting ribs due to weight applied to the at least one supporting structure causes a first bending moment in a clockwise or counterclockwise direction where the at least two supporting ribs are connected to the band configured to be worn around the waist of the carrier and a resulting vertical force formed within the at least two supporting ribs causes a second bending moment in an opposite direction to the clockwise or counterclockwise direction of the first bending moment, respectively, thereby alleviating load carrying effects on the carrier.

10. A weight supporting system comprising:
    a band including at least one securing device to secure at least one supporting structure, the band and the at least one supporting structure configured to provide support to and including at least one of:
    a platform system configured such that a seating supporting section can be positioned to project from a platform member; or
    a back pack; or
    a front pack,
    wherein the at least one supporting structure is configured in a curved configuration and having a first end positioned substantially below the seating supporting section, the back pack or the front pack, and a second end operatively coupled to the securing device, the at least one supporting structure disposed in a curvilinear manner from the first end to be operably coupled to the at least one securing device at the second end,
    wherein the weight of the platform system or the weight of the back pack or the weight of the front pack causing a vertical downward force and a first bending moment with respect to a distance between the first end and the at least one securing device,
    the first bending moment occurring in a clockwise or a counterclockwise direction with respect to an axis perpendicularly traversing the first end,
    the curved configuration of the at least one supporting structure causing a second bending moment in a counterclockwise or clockwise direction respectively with respect to the first bending moment that at least partially counteracts the first bending moment.

11. The weight supporting system according to claim 10, wherein the at least one supporting structure includes at least two supporting ribs that are supported by the band and configured to support the at least one of:
    a platform system configured such that a seating supporting section can be positioned to project from a platform member;
    a back pack; and
    a front pack,
or combinations thereof.

12. The weight supporting system according to claim 10,
    wherein the at least one supporting structure includes at least two supporting ribs connected to the band, the supporting ribs configured in a curved configuration,
    wherein at or near an apex of the at least two supporting ribs a spring force is created, and a bending moment is created where the supporting ribs are connected to the band, and
    wherein a resulting vertical force to the at least two supporting ribs causes a first bending moment in a clockwise or counterclockwise direction where the at least two supporting ribs are connected to the band and a resulting vertical force formed within the at least two supporting ribs causes a second bending moment in an opposite direction to the clockwise or counterclockwise direction of the first bending moment.

* * * * *